US010481925B2

(12) United States Patent
Yang et al.

(10) Patent No.: US 10,481,925 B2
(45) Date of Patent: Nov. 19, 2019

(54) DYNAMIC USER INTERFACE IN MACHINE-TO-MACHINE SYSTEMS

(71) Applicant: Intel Corporation, Santa Clara, CA (US)

(72) Inventors: Shao-Wen Yang, San Jose, CA (US); Yen-Kuang Chen, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/306,571

(22) PCT Filed: Jul. 1, 2016

(86) PCT No.: PCT/US2016/040627
§ 371 (c)(1),
(2) Date: Dec. 1, 2018

(87) PCT Pub. No.: WO2018/004642
PCT Pub. Date: Jan. 4, 2018

(65) Prior Publication Data
US 2019/0138318 A1    May 9, 2019

(51) Int. Cl.
*G06F 9/448* (2018.01)
*G06F 15/16* (2006.01)
(Continued)

(52) U.S. Cl.
CPC ............. *G06F 9/448* (2018.02); *G06F 8/60* (2013.01); *G06F 15/16* (2013.01);
(Continued)

(58) Field of Classification Search
CPC ............. H04L 41/0853; H04L 67/025; H04L 12/2803; H04L 12/2809; H04L 12/2818;
(Continued)

(56) References Cited

U.S. PATENT DOCUMENTS

2004/0220786 A1* 11/2004 Tiwari ............... G06F 17/10
703/2
2007/0208442 A1* 9/2007 Perrone ............. G05D 1/0088
700/95
(Continued)

FOREIGN PATENT DOCUMENTS

WO    2013123445 A1    8/2013

OTHER PUBLICATIONS

International Search Report dated Mar. 29, 2017 for PCT/US2016/040627, 3 pages.
(Continued)

*Primary Examiner* — Ninos Donabed
(74) *Attorney, Agent, or Firm* — Alliance IP, LLC

(57) ABSTRACT

User inputs received through a graphical user interface of a programming tool are used to define a set of capability abstractions for a particular application and further define, based on the one or more user inputs, relationships between the set of capability abstractions. The particular application is to utilize a machine-to-machine network, and the set of capability abstractions include: a sensor capability abstraction, an actuator capability abstraction, a computation logic capability abstraction, an input user interface (UI) capability abstraction, and an output UI capability abstraction for the particular application. The relationships include a relationship between the input UI capability abstraction and the computation logic capability abstraction, where the input UI capability is to provide an input to the computation logic capability abstraction. Service logic for the particular application is generated to deploy an instance of the particular application in an environment based on the set of capability abstractions and relationships.

19 Claims, 15 Drawing Sheets

(51) Int. Cl.
*H04L 12/24* (2006.01)
*H04W 16/00* (2009.01)
*H04W 4/50* (2018.01)
*H04W 4/70* (2018.01)
*G06F 8/60* (2018.01)

(52) U.S. Cl.
CPC ...... *H04L 41/0806* (2013.01); *H04L 41/0853* (2013.01); *H04L 41/22* (2013.01); *H04W 4/50* (2018.02); *H04W 4/70* (2018.02)

(58) Field of Classification Search
CPC ............. H04L 12/2825; H04L 12/2834; H04L 2012/2841; H04L 2012/2843; H04L 2012/285; H04L 43/04; H04L 67/125; H04L 67/26; H04L 67/2823; H04L 67/36; G06Q 50/163
See application file for complete search history.

(56) References Cited

U.S. PATENT DOCUMENTS

| | | | |
|---|---|---|---|
| 2010/0138808 A1* | 6/2010 | Kim | G06F 8/10 717/104 |
| 2011/0230979 A1* | 9/2011 | Reed | G05B 19/4148 700/7 |
| 2012/0016678 A1* | 1/2012 | Gruber | G10L 15/22 704/275 |
| 2014/0241354 A1 | 8/2014 | Shuman et al. | |
| 2014/0244001 A1 | 8/2014 | Glickfield et al. | |
| 2014/0250234 A1* | 9/2014 | Liesche | H04L 67/025 709/228 |
| 2015/0358777 A1* | 12/2015 | Gupta | H04L 12/2807 370/254 |
| 2016/0088049 A1 | 3/2016 | Seed et al. | |
| 2016/0105305 A1 | 4/2016 | Pignataro et al. | |
| 2016/0221186 A1* | 8/2016 | Perrone | B25J 9/1661 |
| 2016/0366141 A1* | 12/2016 | Smith | H04L 63/062 |
| 2017/0139380 A1* | 5/2017 | England | G06Q 50/02 |
| 2018/0095467 A1* | 4/2018 | Perrone | G06K 9/00 |

OTHER PUBLICATIONS

Written Opinion of the International Searching Authority dated Mar. 29, 2017 for PCT/US2016/040627, 7 pages.
International Preliminary Report on Patentability for PCT Application No. PCT/US2016/040627 dated Jan. 1, 2019, 9 pages.

* cited by examiner

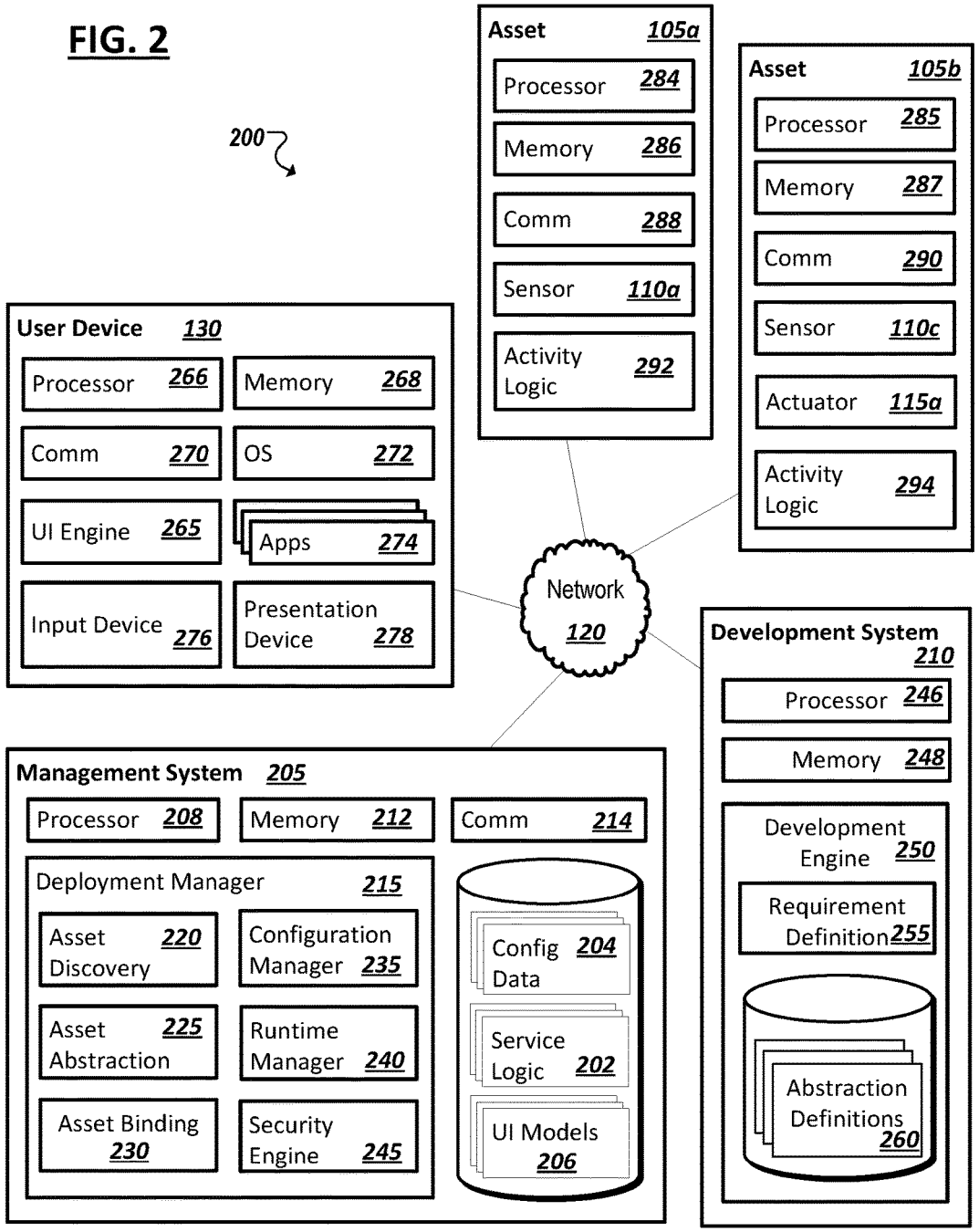

DYNAMIC USER INTERFACE IN MACHINE-TO-MACHINE SYSTEMS

CROSS-REFERENCE TO RELATED APPLICATIONS

This application is a national stage application under 35 U.S.C. § 371 of PCT International Application Serial No. PCT/US2016/040627, filed on Jul. 1, 2016, and entitled DYNAMIC USER INTERFACE IN MACHINE-TO-MACHINE SYSTEMS. The disclosure of the prior application is considered part of and is hereby incorporated by reference in its entirety in the disclosure of this application.

TECHNICAL FIELD

This disclosure relates in general to the field of computer systems and, more particularly, to managing machine-to-machine systems.

BACKGROUND

The Internet has enabled interconnection of different computer networks all over the world. While previously, Internet-connectivity was limited to conventional general purpose computing systems, ever increasing numbers and types of products are being redesigned to accommodate connectivity with other devices over computer networks, including the Internet. For example, smart phones, tablet computers, wearables, and other mobile computing devices have become very popular, even supplanting larger, more traditional general purpose computing devices, such as traditional desktop computers in recent years. Increasingly, tasks traditionally performed on a general purpose computers are performed using mobile computing devices with smaller form factors and more constrained features sets and operating systems. Further, traditional appliances and devices are becoming "smarter" as they are ubiquitous and equipped with functionality to connect to or consume content from the Internet. For instance, devices, such as televisions, gaming systems, household appliances, thermostats, automobiles, watches, have been outfitted with network adapters to allow the devices to connect with the Internet (or another device) either directly or through a connection with another computer connected to the network. Additionally, this increasing universe of interconnected devices has also facilitated an increase in computer-controlled sensors that are likewise interconnected and collecting new and large sets of data. The interconnection of an increasingly large number of devices, or "things," is believed to foreshadow a new era of advanced automation and interconnectivity, referred to, sometimes, as the Internet of Things (IoT).

BRIEF DESCRIPTION OF THE DRAWINGS

FIG. 2 illustrates an embodiment of a system including an example management system.

Like reference numbers and designations in the various drawings indicate like elements.

DETAILED DESCRIPTION OF EXAMPLE EMBODIMENTS

Figure 1A:
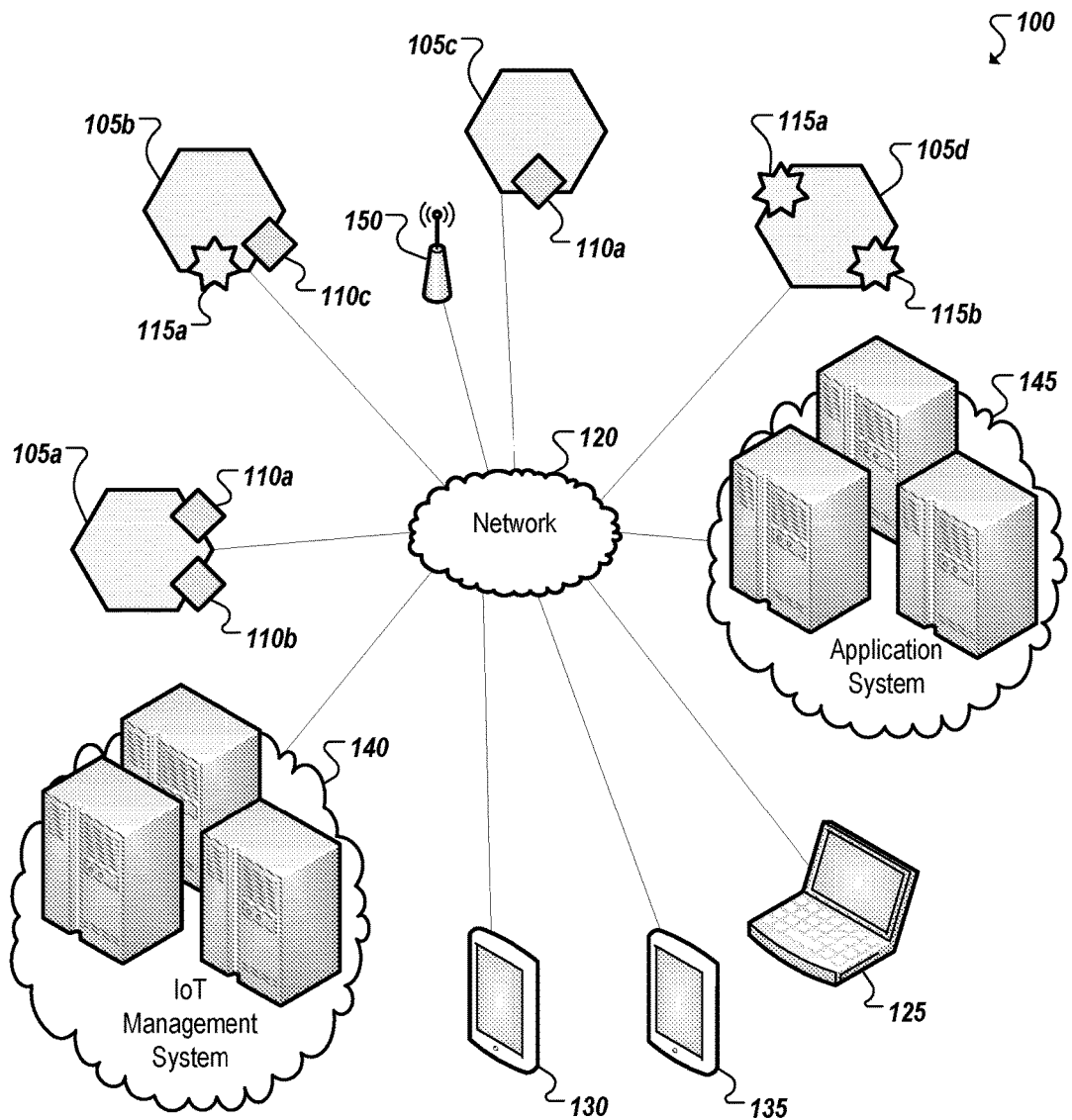
FIG. 1A illustrates an embodiment of a system including multiple sensor devices and an example management system.

FIG. 1A is a block diagram illustrating a simplified representation of a system 100 that includes one or more devices 105*a-d*, or assets, deployed throughout an environment. Each device 105*a-d* may include a computer processor and/or communications module to allow each device 105*a-d* to interoperate with one or more other devices (e.g., 105*a-d*) or systems in the environment. Each device can further include one or more instances of various types of sensors (e.g., 110*a-c*), actuators (e.g., 115*a-b*), storage, power, computer processing, and communication functionality which can be leveraged and utilized (e.g., by other devices or software) within a machine-to-machine, or Internet of Things (IoT) system or application. In some cases, inter-device communication and even deployment of an IoT application may be facilitated by one or more gateway devices through which one or more of the devices (e.g., 105*a-d*) communicate and gain access to other devices and systems in one or more networks (e.g., 120).

Sensors, or sensor assets, are capable of detecting, measuring, and generating sensor data describing characteristics of the environment in which they reside, are mounted, or are in contact with. For instance, a given sensor (e.g., 110*a-c*) may be configured to detect one or more respective characteristics such as movement, weight, physical contact, temperature, wind, noise, light, computer communications, wireless signals, position, humidity, the presence of radiation, liquid, or specific chemical compounds, among several other examples. Indeed, sensors (e.g., 110*a-c*) as described herein, anticipate the development of a potentially limitless universe of various sensors, each designed to and capable of detecting, and generating corresponding sensor data for, new and known environmental characteristics. Actuators (e.g., 115*a-b*) can allow the device to perform some kind of action to affect its environment. For instance, one or more of the devices (e.g., 105*b, d*) may include one or more respective actuators that accepts an input and perform its respective action in response. Actuators can include controllers to activate additional functionality, such as an actuator to selectively toggle the power or operation of an alarm, camera (or other sensors), heating, ventilation, and air conditioning (HVAC) appliance, household appliance, in-vehicle device, lighting, among other examples.

In some implementations, sensors 110a-c and actuators 115a-b provided on devices 105a-d can be assets incorporated in and/or forming an Internet of Things (IoT) or machine-to-machine (M2M) system. IoT systems can refer to new or improved ad-hoc systems and networks composed of multiple different devices interoperating and synergizing to deliver one or more results or deliverables. Such ad-hoc systems are emerging as more and more products and equipment evolve to become "smart" in that they are controlled or monitored by computing processors and provided with facilities to communicate, through computer-implemented mechanisms, with other computing devices (and products having network communication capabilities). For instance, IoT systems can include networks built from sensors and communication modules integrated in or attached to "things" such as equipment, toys, tools, vehicles, etc. and even living things (e.g., plants, animals, humans, etc.). In some instances, an IoT system can develop organically or unexpectedly, with a collection of sensors monitoring a variety of things and related environments and interconnecting with data analytics systems and/or systems controlling one or more other smart devices to enable various use cases and application, including previously unknown use cases. Further, IoT systems can be formed from devices that hitherto had no contact with each other, with the system being composed and automatically configured spontaneously or on the fly (e.g., in accordance with an IoT application defining or controlling the interactions). Further, IoT systems can often be composed of a complex and diverse collection of connected devices (e.g., 105a-d), such as devices sourced or controlled by varied groups of entities and employing varied hardware, operating systems, software applications, and technologies. In some cases, a gateway (e.g., 150) may be provided to localize a particular IoT system, with the gateway able to detect nearby devices (e.g., 105a-d) and deploy (e.g., in an automated, impromptu manner) an instance of a particular IoT application by orchestrating configuration of these detected devices to satisfy requirements of the particular IoT application, among other examples.

Facilitating the successful interoperability of such diverse systems is, among other example considerations, an important issue when building or defining an IoT system. Software applications can be developed to govern how a collection of IoT devices can interact to achieve a particular goal or service. In some cases, the IoT devices may not have been originally built or intended to participate in such a service or in cooperation with one or more other types of IoT devices. Indeed, part of the promise of the Internet of Things is that innovators in many fields will dream up new applications involving diverse groupings of the IoT devices as such devices become more commonplace and new "smart" or "connected" devices emerge. However, the act of programming, or coding, such IoT applications may be unfamiliar to many of these potential innovators, thereby limiting the ability of these new applications to be developed and come to market, among other examples and issues.

As shown in the example of FIG. 1A, multiple IoT devices (e.g., 105a-d) can be provided from which one or more different IoT applications can be built. For instance, a device (e.g., 105a-d) can include such examples as a mobile personal computing device, such as a smart phone or tablet device, a wearable computing device (e.g., a smart watch, smart garment, smart glasses, smart helmet, headset, etc.), purpose-built devices such as and less conventional computer-enhanced products such as home, building, vehicle automation devices (e.g., smart heat-ventilation-air-conditioning (HVAC) controllers and sensors, light detection and controls, energy management tools, etc.), smart appliances (e.g., smart televisions, smart refrigerators, etc.), and other examples. Some devices can be purpose-built to host sensor and/or actuator resources, such as a weather sensor devices that include multiple sensors related to weather monitoring (e.g., temperature, wind, humidity sensors, etc.), traffic sensors and controllers, among many other examples. Some devices may be statically located, such as a device mounted within a building, on a lamppost, sign, water tower, secured to a floor (e.g., indoor or outdoor), or other fixed or static structure. Other devices may be mobile, such as a sensor provisioned in the interior or exterior of a vehicle, in-package sensors (e.g., for tracking cargo), wearable devices worn by active human or animal users, an aerial, ground-based, or underwater drone among other examples. Indeed, it may be desired that some sensors move within an environment and applications can be built around use cases involving a moving subject or changing environment using such devices, including use cases involving both moving and static devices, among other examples.

Continuing with the example of FIG. 1A, software-based IoT management platforms can be provided to allow developers and end users to build and configure IoT applications and systems. An IoT application can provide software support to organize and manage the operation of a set of IoT device for a particular purpose or use case. In some cases, an IoT application can be embodied as an application on an operating system of a user computing device (e.g., 125), a mobile app for execution on a smart phone, tablet, smart watch, or other mobile device (e.g., 130, 135), a remote server, and/or gateway device (e.g., 150). In some cases, the application can have or make use of an application management utility allowing users to configure settings and policies to govern how the set devices (e.g., 105a-d) are to operate within the context of the application. A management utility can also be used to orchestrate the deployment of a particular instance of an IoT application, including the automated selection and configuration of devices (and their assets) that are to be used with the application. In some cases, an IoT management application may be provided (e.g., on a gateway, user device, or cloud-based server, etc.), which can manage potentially multiple different IoT applications or systems. Indeed, an IoT management application, or system, may be hosted on a single system, such as a single server system (e.g., 140), a single end-user device (e.g., 125, 130, 135), or a single gateway device (e.g., 150), among other examples. Alternatively, an IoT management system can be distributed across multiple hosting devices (e.g., 125, 130, 135, 140, 150, etc.).

As noted above, IoT applications may be localized, such that a service is implemented utilizing an IoT system (e.g., of devices 105a-d) within a specific geographic area, room, or location. In some instances, IoT devices (e.g., 105a-d) may connect to one or more gateway devices (e.g., 150) on which a portion of management functionality (e.g., as shared with or supported by management system 140) and a portion of application service functionality (e.g., as shared with or supported by application system 145). Service logic and configuration data may be pushed (or pulled) to the gateway device 150 and used to configure IoT devices (e.g., 105*a-d*, 130, 135, etc.) within range or proximity of the gateway device 150 to allow the set of devices to implement a particular service within that location. A gateway device (e.g., 150) may be implemented as a dedicated gateway element, or may be a multi-purpose or general purpose device, such as another IoT device (similar to devices 105*a-d*) or user device (e.g., 125, 130, 135) that itself may include sensors and/or actuators to perform tasks within an IoT system, among other examples.

In some cases, applications can be programmed, or otherwise built or configured, utilizing interfaces of an IoT management system or a dedicated IoT application development platform. In some cases, IoT application development tools can adopt asset abstraction to simplify the IoT application building process. For instance, users can simply select classes, or taxonomies, of devices and logically assemble a collection of select devices classes to build at least a portion of an IoT application (e.g., without having to provide details regarding configuration, device identification, data transfer, etc.). IoT application development tools may further utilize asset abstraction to develop and define deployment of one or more graphical user interfaces (GUIs) for use in a deployment of the resulting IoT application, to allow user control and management of a deployment during runtime. Further, IoT application systems built using the IoT management system can be sharable, in that a user can send data identifying the constructed system to another user, allowing the other user to simply port the abstracted system definition to the other user's environment (even when the combination of device models is different from that of the original user's system). Additionally, system or application settings, defined by a given user, can be configured to be sharable with other users or portable between different environments, among other example features.

In some cases, IoT systems can interface (through a corresponding IoT management system or application or one or more of the participating IoT devices) with remote services, such as data storage, information services (e.g., media services, weather services), geolocation services, and computational services (e.g., data analytics, search, diagnostics, etc.) hosted in cloud-based and other remote systems (e.g., 140, 145). For instance, the IoT system can connect to a remote service (e.g., 145) over one or more networks 120. In some cases, the remote service can, itself, be considered an asset of an IoT application. Data received by a remotely-hosted service can be consumed by the governing IoT application and/or one or more of the component IoT devices to cause one or more results or actions to be performed, among other examples.

One or more networks (e.g., 120) can facilitate communication between sensor devices (e.g., 105*a-d*), end user devices (e.g., 123, 130, 135), gateways (e.g., 150), and other systems (e.g., 140, 145) utilized to implement and manage IoT applications in an environment. Such networks can include wired and/or wireless local networks, public networks, wide area networks, broadband cellular networks, the Internet, and the like.

In general, "servers," "clients," "computing devices," "network elements," "hosts," "system-type system entities," "user devices," "gateways," "IoT devices," "sensor devices," and "systems" (e.g., 105*a-d*, 125, 130, 135, 140, 145, 150, etc.) in example computing environment 100, can include electronic computing devices operable to receive, transmit, process, store, or manage data and information associated with the computing environment 100. As used in this document, the term "computer," "processor," "processor device," or "processing device" is intended to encompass any suitable processing apparatus. For example, elements shown as single devices within the computing environment 100 may be implemented using a plurality of computing devices and processors, such as server pools including multiple server computers. Further, any, all, or some of the computing devices may be adapted to execute any operating system, including Linux, UNIX, Microsoft Windows, Apple OS, Apple iOS, Google Android, Windows Server, etc., as well as virtual machines adapted to virtualize execution of a particular operating system, including customized and proprietary operating systems.

While FIG. 1A is described as containing or being associated with a plurality of elements, not all elements illustrated within computing environment 100 of FIG. 1A may be utilized in each alternative implementation of the present disclosure. Additionally, one or more of the elements described in connection with the examples of FIG. 1A may be located external to computing environment 100, while in other instances, certain elements may be included within or as a portion of one or more of the other described elements, as well as other elements not described in the illustrated implementation. Further, certain elements illustrated in FIG. 1A may be combined with other components, as well as used for alternative or additional purposes in addition to those purposes described herein.

As noted above, a collection of devices, or endpoints, may participate in Internet-of-things (IoT) networking, which may utilize wireless local area networks (WLAN), such as those standardized under IEEE 802.11 family of standards, home-area networks such as those standardized under the Zigbee Alliance, personal-area networks such as those standardized by the Bluetooth Special Interest Group, cellular data networks, such as those standardized by the Third-Generation Partnership Project (3GPP), and other types of networks, having wireless, or wired, connectivity. For example, an endpoint device may also achieve connectivity to a secure domain through a bus interface, such as a universal serial bus (USB)-type connection, a High-Definition Multimedia Interface (HDMI), or the like.

Figure 1B:
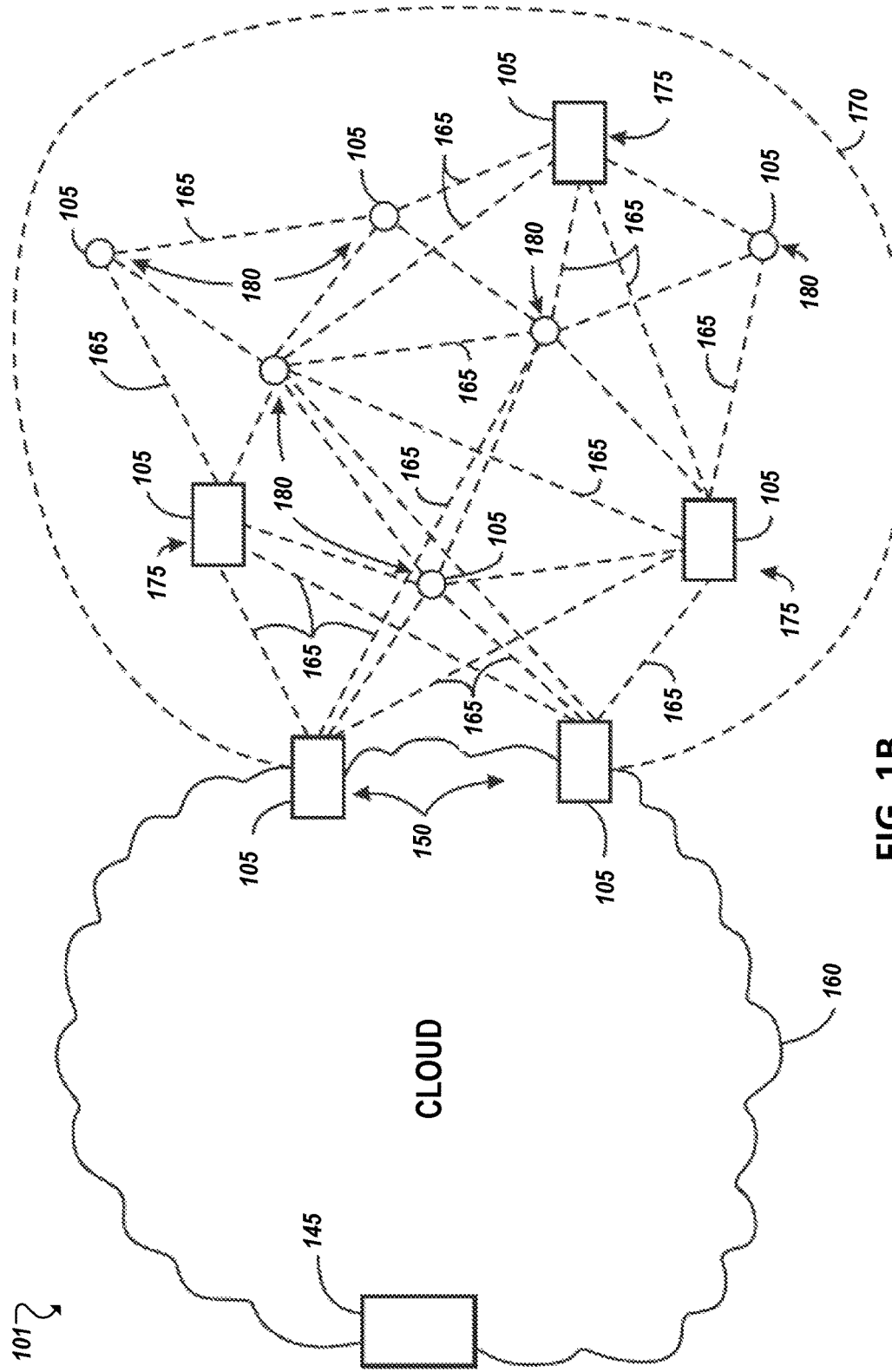
FIG. 1B illustrates an embodiment of a cloud computing network.

As shown in the simplified block diagram 101 of FIG. 1B, in some instances, a cloud computing network, or cloud, in communication with a mesh network of IoT devices (e.g., 105*a-d*), which may be termed a "fog," may be operating at the edge of the cloud. To simplify the diagram, not every IoT device 105 is labeled.

The fog 170 may be considered to be a massively interconnected network wherein a number of IoT devices 105 are in communications with each other, for example, by radio links 165. This may be performed using the open interconnect consortium (OIC) standard specification 1.0 released by the Open Connectivity Foundation™ (OCF) on Dec. 23, 2015. This standard allows devices to discover each other and establish communications for interconnects. Other interconnection protocols may also be used, including, for example, the optimized link state routing (OLSR) Protocol, or the better approach to mobile ad-hoc networking (B.A.T.M.A.N.), among others.

Three types of IoT devices 105 are shown in this example, gateways 150, data aggregators 175, and sensors 180, although any combinations of IoT devices 105 and functionality may be used. The gateways 150 may be edge devices that provide communications between the cloud 160 and the fog 170, and may also function as charging and locating devices for the sensors 180. The data aggregators 175 may provide charging for sensors 180 and may also locate the sensors 180. The locations, charging alerts, battery alerts, and other data, or both may be passed along to the cloud 160 through the gateways 150. As described herein, the sensors 180 may provide power, location services, or both to other devices or items.

Communications from any IoT device 105 may be passed along the most convenient path between any of the IoT devices 105 to reach the gateways 150. In these networks, the number of interconnections provide substantial redundancy, allowing communications to be maintained, even with the loss of a number of IoT devices 105.

The fog 170 of these IoT devices 105 devices may be presented to devices in the cloud 160, such as a server 145, as a single device located at the edge of the cloud 160, e.g., a fog 170 device. In this example, the alerts coming from the fog 170 device may be sent without being identified as coming from a specific IoT device 105 within the fog 170. For example, an alert may indicate that a sensor 180 needs to be returned for charging and the location of the sensor 180, without identifying any specific data aggregator 175 that sent the alert.

In some examples, the IoT devices 105 may be configured using an imperative programming style, e.g., with each IoT device 105 having a specific function. However, the IoT devices 105 forming the fog 170 device may be configured in a declarative programming style, allowing the IoT devices 105 to reconfigure their operations and determine needed resources in response to conditions, queries, and device failures. For example, a query from a user located at a server 145 about the location of a sensor 180 may result in the fog 170 device selecting the IoT devices 105, such as particular data aggregators 175, needed to answer the query. If the sensors 180 are providing power to a device, sensors associated with the sensor 180, such as power demand, temperature, and the like, may be used in concert with sensors on the device, or other devices, to answer a query. In this example, IoT devices 105 in the fog 170 may select the sensors on particular sensor 180 based on the query, such as adding data from power sensors or temperature sensors. Further, if some of the IoT devices 105 are not operational, for example, if a data aggregator 175 has failed, other IoT devices 105 in the fog 170 device may provide substitute, allowing locations to be determined.

Further, the fog 170 may divide itself into smaller units based on the relative physical locations of the sensors 180 and data aggregators 175. In this example, the communications for a sensor 180 that has been instantiated in one portion of the fog 170 may be passed along to IoT devices 105 along the path of movement of the sensor 180. Further, if the sensor 180 is moved from one location to another location that is in a different region of the fog 170, different data aggregators 175 may be identified as charging stations for the sensor 180.

As an example, if a sensor 180 is used to power a portable device in a chemical plant, such as a personal hydrocarbon detector, the device will be moved from an initial location, such as a stockroom or control room, to locations in the chemical plant, which may be a few hundred feet to several thousands of feet from the initial location. If the entire facility is included in a single fog 170 charging structure, as the device moves, data may be exchanged between data aggregators 175 that includes the alert and location functions for the sensor 180, e.g., the instantiation information for the sensor 180. Thus, if a battery alert for the sensor 180 indicates that it needs to be charged, the fog 170 may indicate a closest data aggregator 175 that has a fully charged sensor 180 ready for exchange with the sensor 180 in the portable device.

With the growth of IoT devices and system, there are increasing numbers of smart and connected devices available in the market, such as devices capable of being utilized in home automation, factory automation, smart agriculture, and other IoT applications and systems. For instance, in home automation systems, automation of a home is typically increased as more IoT devices are added for use in sensing and controlling additional aspects of the home. However, as the number and variety of devices increase, the management of "things" (or devices for inclusion in IoT systems) becomes outstandingly complex and challenging.

Some device management applications may be configured with preset settings designed to allow users to set up their systems quickly and with minimal work configuring the device. However, those settings may not be universally desirable, potentially limiting their flexibility and overall utility. Indeed, the combination of settings that is ideal or optimal to one user may be subjective, however, other users may still be interested in the setting values determined by others which yielded these other users desirable results. In cases, where settings are configurable, a user may nonetheless struggle to make sense of the ideal combination of setting values, resorting to trial and error to figure out the optimal settings for their system (e.g., smart home, office, car, etc.). For instance, a guest of a first user may observe, first hand, the configuration of the first user's system and desire to recreate the attributes of the observed system in their own system. However, in traditional systems, system settings are typically not portable due given that they are usually tied to identities of devices. Additionally, changing the parameters of an application's deployment may require an existing service to be withdrawn and revised before a more desirable deployment may be launched.

In traditional systems, each IoT device has its own device's unique media access control (MAC) address or other device identifier. User-customized settings may be tied to a specified device present in the system when the settings were first configured. However, in traditional systems, when a user replaces this device with another (e.g., newer) substitute device, the user is often required to reconfigure the device settings (including device identifier and device MAC address) in the application.

Given the dramatic growth in smart devices and promise of IoT systems, there have been considerable efforts in developing administrative tools for managing devices, data, resources, services, etc. in IoT application. Part of the promise of IoT systems, is that users can configure a customized IoT application specific to a user's home, an office space, or other environment. Tools have been developed such as IFTTT, SmartThings, Wink, and other systems have been developed, which provide a platform through which an end user may develop a new IoT service using various sets of devices supported by each respective platform. Such service development tools have been used to facilitate the customized creation of services to realize automation application such as smart lighting, smart door lock, automated security, smart agriculture, etc.

While IoT development tools may assist in realizing new automation applications bringing great convenience, comfort, energy efficiency and security, one of the drawbacks of such systems (and the development tools used to program such applications) is that human involvement is typically limited purely to pre-deployment time, or development time. After developing a new IoT service using a traditional IoT development tool, however, the user-programmer is typically excluded from the decision making loop within the service in post-deployment time, or runtime. While conventional end-to-end turnkey solutions continue to be installed and configured by experienced technicians or engineers, growth in IoT may be expected to be focused primarily on "home-brewed" IoT services developed and installed by lay users with little or no formal training or experience. Novice users, while short on formal training, may be well-positioned to drive the design of IoT services given their typically superior knowledge of the domain in which the IoT service is to be deployed.

While some development tools have been tailored to simplifying pre-deployment time for IoT users, limited access to runtime control forces many users to iterate through the pre-deployment process in an inspect-revise cycle to get the post-deployment product they want it. For example, a user may use an IoT development tool to program a smart lighting script to use illuminance measures from a light sensor to determine whether or not to turn a bulb on (e.g., the bulb will be turned on if the light sensor reading is less than 12,345; otherwise, the bulb will be turned off). While launching an IoT application based on this script may be straightforward, troubleshooting and debugging the script in post-deployment time may be more difficult. For instance, conventional IoT management tools may provide a pre-configured mechanism for a user to inspect sensor values (e.g., through a fixed pre-defined GUI provided with a corresponding smartphone app), but lack the ability for a user to tune the presentation (visualization) to the particular characteristics of the IoT service and/or the preferences of the user-developer. Further, while an IoT development may provide a user with control to change and adjust an IoT service in pre-deployment time, traditional systems do not allow for humans to reconfigure parameters incorporated in the service logic (e.g., the light sensor reading threshold 12,345) in the post-deployment time. Instead, traditional IoT development tools require a user to first "undeploy" the service, transition back to pre-deployment time and revise the program before re-starting the corrected service.

In some implementations, an improved system may be provided with enhancements to address at least some of the example issues above. For instance, an improved IoT development platform may be provided that enables the development and creation of IoT services based on defined asset abstractions. Asset abstraction may significantly reduce the human touch points during deployment and redeployment and facilitate the deployment of impromptu IoT systems, including IoT systems with corresponding user interfaces allowing post-deployment involvement of a user. For instance, user interface abstraction may be incorporated in an asset abstraction scheme to allow automated and dynamic discovery and use of devices an IoT application deployment. User interface abstraction cam provide a mechanism to address changes in the post-deployment time (without redeploying by going back and forth between pre-deployment and post-deployment) and allow service developers to define what-you-see-is-what-you-get (WYSIWYG) abstracted user interfaces appropriate for the IoT service and enabling on-the-fly changes during runtime.

With asset abstraction, IoT management and applications can adopt a paradigm where, instead of referencing and being programmed to interoperate with specific IoT devices, the system can refer to abstracted classes, or taxonomies, of IoT devices (or "assets"). Asset abstraction can be leveraged to automatically configure a deployed IoT system (including corresponding UIs) with minimal human intervention. Indeed, in some instances, configuration of the system can progress without a user having to actually specify which device to use. Instead, a deployment policy can be used instead by the system to automatically select and configure at least a portion of the devices within the system. Further, asset abstraction can facilitate addressing the challenge of portability of IoT applications, which has traditionally limited the general scalability and resiliency of IoT applications.

Asset abstraction can be coupled with automated asset binding, in some cases, to eliminate the necessity of including a device/asset's unique ID in an IoT application or management program. Asset discovery provided with the application or management program can provide an effective means for specifying policy and confining the scope of asset binding. Through the combination of asset discovery, asset abstraction, and asset binding makes IoT applications portable, reusable and sharable.

In some implementations, with asset abstraction, assets are treated indifferently as long they fall into a same category in the taxonomy, e.g., occupancy sensing, image capture, computation, etc. An IoT application, consequently, can be made portable, reusable and sharable, as it can be written and stored in a way that specifies only requirements (e.g., references to abstracted device taxonomies providing the requirements) without specifying the precise identity (or catalogue of identities) of compatible devices meant to provide these requirements. Asset discovery allows all available resources to be searched to detect those meeting the requirements and further selected, in some instances, on the basis of customizable or policy-based criteria.

Systems, such as those shown and illustrated herein, can include machine logic implemented in hardware and/or software to implement the solutions introduced herein and address at least some of the example issues above (among others). For instance, FIG. 2 shows a simplified block diagram 200 illustrating a system including multiple IoT devices (e.g., 105*a-b*) with assets (e.g., sensors (e.g., 110*a,c*) and/or actuators (e.g., 115*a*)) capable of being used in a variety of different IoT applications. In the example of FIG. 2, a management system 205 is provided with deployment manager logic 215 (implemented in hardware and/or software) to detect assets within a location and identify opportunities to deploy an IoT system utilizing the detected assets. In some implementations, at least a portion of the service logic (e.g., 202) utilized to drive the function of the IoT application may be hosted on the management system 205. Service logic (e.g., 202) may also be hosted (additionally or alternatively) on one or more remote computing devices remote from the management system 205, including on devices (e.g., 105*a-b*) utilized within the IoT application deployment, servers within the environment in which the IoT application will be deployed, and/or cloud-based systems (remote from the location where the IoT application will be deployed). Configuration data (e.g., 204) to be used to configure the assets to be utilized in the deployment of the IoT system may also be hosted on the management system 205 or accessed by the management system 205 from one or more other systems, including a user device (e.g., 130) or a remote (e.g., cloud-based) server, among other example implementations.

In the particular example of FIG. 2, the management system 205 may include one or more data processing apparatus (or "processors") 208, one or more memory elements 212, and one or more communication modules 214 incorporating hardware and logic to allow the management system 205 to communicate over one or more networks (e.g., 120), utilizing one or more technologies (e.g., WiFi, Bluetooth, Near Field Communications, Zigbee, Ethernet, etc.), with other systems and devices (e.g., 105*a*, 105*b*, 130, 210, etc.). The deployment manager 215 may be implemented utilizing code executable by the processor 208 to manage the automated deployment of a local IoT system. In some cases, the management system 205 may be implemented on a dedicated physical system (e.g., separate from other devices in the IoT deployment). For instance, the management system 205 may be implemented on a gateway device used to facilitate communication with and between multiple potential IoT devices (e.g., 105a,b) within a particular location. In some instances, the management system 205 may be hosted at least in part on a user device (e.g., 130), including a user device that it utilized itself in the deployment of a particular IoT application. Indeed, portions of the management system 205 (and deployment manager 215) may be implemented on multiple devices, including some devices remote from the environment in which the IoT application is to be deployed.

In one example, a deployment manager 215 may be provided that includes logical components such as an asset discovery module 220, asset abstraction manager 225, asset binding manager 230 configuration manager 235, runtime manager 240, and security engine 245, among other example components (or combinations of the foregoing). The deployment manager 215 may access local (or remotely stored) service logic 202, configuration data 204, and user interface (UI) models 206, among other examples.

In one example, an asset discovery module 220 may be provide functionality to allow the management system 205 to determine which IoT devices (e.g., 105a,b, 130) are within range of the management system 205 and thus fall within a particular location for which one or more IoT services may be deployed. In some implementations, the asset discovery module 220 makes use of the wireless communication capabilities (e.g., 214) of the management system 205 to attempt to communicate with devices within a particular radius. For instance, devices within range of a WiFi or Bluetooth signal emitted from the antenna(e) of the communications module(s) 214 of the management system 205 (or the communications module(s) (e.g., 288, 290) of the assets (e.g., 105a,b)) can be detected. Additional attributes can be considered by the asset discovery module 220 when determining whether a device is suitable for inclusion in a collection of devices for a given system or application. In some implementations, conditions can be defined for determining whether a device should be included in the collection. For instance, the asset discovery module 220 may attempt to identify, not only that it is capable of contacting a particular asset, but may also determine assets such as physical location, semantic location, temporal correlation, movement of the device (e.g., is it moving in the same direction and/or rate as the discovery module's host), permissions or access level requirements of the device, among other characteristics. As an example, in order to deploy smart lighting control for every room in a home- or office-like environment, an application may be deployed in a "per room basis." Accordingly, the asset discovery module 220 can determine a listing of devices that are identified (e.g., through a geofence or semantic location data reported by the device) as within a particular room (despite the asset discovery module 220 being able to communicate with and detect other devices falling outside the desired semantic location).

Conditions for discovery can be defined in service logic (e.g., 202) of a particular IoT application. For instance, criteria can be defined to identify which types of resources are needed or desired to implement an application. Such conditions can go beyond proximity, and include identification of the particular types of assets that the application is to use. For instance, the asset discovery module 220 may additionally identify attributes of the device, such as its model or type, through initial communications with a device, and thereby determine what assets and asset types (e.g., specific types of sensors, actuators, memory and computing resources, etc.) are hosted by the device. Accordingly, discovery conditions and criteria can be defined based on asset abstractions (or asset taxonomies) defined for the IoT application. Some criteria may be defined that is specific to a particular asset type, where the criteria has importance for some asset types but not for others in the context of the corresponding IoT application. Further, some discovery criteria may be configurable such that a user can custom-define at least some of the criteria or preferences used to select which devices to utilize in furtherance of an IoT application.

A deployment manager 215 can also include an asset abstraction module 225. An asset abstraction module 225 can recognize defined mappings between specific IoT devices or, more generally, specific functionality that may be included in any one of a variety of present or future IoT devices with a collection of defined taxonomies, or device abstractions. The asset abstraction module 225 can determine, for each asset discovered by an asset discovery module 220 (e.g., according to one or more conditions), a respective asset abstraction, or taxonomy, to which the asset "belongs". Each taxonomy can correspond to a functional capability of an asset. Assets known or determined to possess the capability can be grouped within the corresponding taxonomy. Some multi-function assets may be determined to belong to multiple of the taxonomies. The asset abstraction module 225 can, in some cases, determine the abstraction(s) to be applied to a given asset based on information received from the asset (e.g., during discovery by asset discovery module 220). In some cases, the asset abstraction module can obtain identifiers from each asset and query a backend database for pre-determined abstraction assignments corresponding to that make and model of asset, among other examples. Further, in some implementations, the asset abstraction module 225 can query each asset (e.g., according to a defined protocol) to determine a listing of the capabilities of the asset, from which the asset abstraction module 225 can map the asset to one or more defined abstraction taxonomies. Asset abstraction module 225 allows the application to treat every asset falling within a given taxonomy as simply an instance of that taxonomy, rather than forcing the deployment manager 215 to track every possible device model with which it might be asked to manage or service logic 202 to be designed to consider every possible permutation of a particular type of device. Asset abstraction module 225 can access a taxonomy framework (defined on an application-, system-, or universal-basis) that abstracts away the precise device into taxonomies including higher- and lower-level taxonomies for sensing, actuating, computation, storage, and other taxonomies. With asset abstraction, assets are treated indifferently as long they fall into a same category in the taxonomy, e.g., occupancy sensing. Deployment of an IoT application, implemented through its corresponding service logic 202 and configurations 204, may be automated in part through asset abstraction, allowing applications to be developed and deployed without concern for the specific identities of the devices to be used in the system.

A deployment manager 205 can also include an asset binding module 230 which can select, from the discovered assets, which assets to deploy for a system. In some cases, upon selecting an asset, the asset binding module 230 can operate with configuration manager 235 to send configuration information (e.g., 204) to selected assets to cause each corresponding asset to be configured for use in a particular service. This can involve provisioning the asset with corresponding service logic code (e.g., to allow it to communicate and interoperate with the gateway, a service hosted by a backend server, and/or other assets selected for deployment), logging in, unlocking, or otherwise enabling the asset, sending session data to or requesting a session with the asset, among other examples. In cases where multiple assets of the same taxonomy have been identified (and exceed a maximum desired number of instances of the taxonomy), the asset binding module 230 can additionally assess which of the assets is the best fit for the deployment. For instance, service logic (e.g., 202) may define binding criteria indicating desirable attributes of assets to be deployed in an application. These criteria can be global criteria, applying to instances of every taxonomy, or can be taxonomy-specific (i.e., only applying to decisions between assets within the same taxonomy). Asset binding can provision the assets specified by the service logic (e.g., 202) for deployment automatically (before or during runtime).

A deployment manager 215 can additionally provide functionality (e.g., through configuration manager 235) to allow configurations, or settings, to be applied to the selected asset taxonomies (or requirements) of the IoT application and the IoT application generally. A variety of different settings can be provided depending on the collection of assets to be used by the application and the overall objectives of the application. Default setting values can be defined and further tools can be provided to allow users to define their own values for the settings (e.g., a preferred temperature setting of an air conditioner, the number of seconds to lock a smart lock or locker, sensitivity setting utilized for triggering a motion sensor and control, etc.). What settings constitute the "ideal" may be subjective and involve some tinkering by the user. When the user is satisfied with the settings, the user may save the settings as a configuration. In some implementations, these configurations (e.g., 204) can be stored locally at the management system 205, a device (e.g., 105a,b), on an IoT gateway 150, or on the cloud. In some cases, configurations can be shared, such that a user can share the settings they found ideal with other users (e.g., friends or social network contacts, etc.).

Configuration data can be generated from which the settings are automatically readopted at runtime by the deployment manager 215, each time a corresponding service is to deploy (e.g., using whatever assets are currently discoverable within a particular location). Consequently, while specific devices may only be loosely tied to any one user or gateway in a particular deployment of a service, settings can be strongly tied to a user or service, such that the user may migrate between environments and the service may be deployed in various environments, including environments with different sets of assets, with the same settings, or configuration, being applied in each environment. For instance, regardless of the specific device identifiers or implementations selected to satisfy the abstracted asset requirements of an application or service, the same settings can be applied (e.g., as the settings, too, are directed to the abstractions of the assets (i.e., rather than specific assets)). To the extent a particular setting does not apply to a selected instance of a taxonomy, the setting can be ignored. If a selected instance of a taxonomy possesses settings that are undefined by the user in the configuration (e.g., because they are unique to the particular asset), default values for these settings can be automatically set or the user can be alerted that these settings are undefined, among other examples.

A configuration manager 235 may be additionally used in runtime (e.g., during and following deployment of an IoT system) to cause particular settings to be applied at the IoT devices (assets) selected for deployment with the service. The deployment manager 215 may include logic enabling the deployment manager 215 (and its composite modules) to communicate using a variety of different protocols with a variety of different devices. Indeed, the deployment manager 215 can even be used to translate between protocols to facilitate asset-to-asset communications. Further, the configuration manager 235 can send instructions to each of the selected assets for deployment to prompt each asset to adjust settings in accordance with those defined for the asset taxonomy in the setting configuration defined in configuration data pushed to (or pulled from) the configuration manager 235 during (and potentially also after) deployment.

A system utilizing a gateway enhanced with deployment manager 215 may be enabled to combine automatic resource management/provisioning with auto-deployment of services. A configuration manager 235 can allow resource configurations from one IoT system to be carried over and applied to another so that services can be deployed in various IoT systems. Further, a runtime manager 240 can be utilized to perform automated deployment and management of a service resulting from the deployment at runtime. Auto-configuration can refer to the configuration of devices with configurations (e.g., 204) stored locally or on a remote node, to provide assets (and their host devices) with the configuration information to allow the asset to be properly configured to operate within a corresponding IoT application deployment. As an example, a device may be provided with configuration information usable by the device to tune a microphone sensor asset on the device so that is might properly detect certain sounds for use in a particular IoT system (e.g., tune the microphone to detect specific voice pitches with improved gain). Auto-deployment of a services may involves identification (or discovery) of available devices, device selection (or binding) based on service requirements (configuration options, platform, and hardware), and automated continuous deployment (or re-deployment) to allow the service to adapt to evolving conditions.

In one example, a runtime manager 240 may be utilized to direct the deployment and running of a service on a set of devices within a particular location (e.g., a location corresponding to a gateway implementing the management system 205). In one example, runtime manager 240 may trigger asset discovery and binding (e.g., by asset discovery module 220 and asset binding manager 230) in connection with the deployment of a particular application. Runtime manager 240 may access service logic 202 for a particular application, or service, and may communicate with deployed devices (e.g., 105a-b, 130, etc.) to send data to the devices (e.g., to prompt certain actuators) or receive data (e.g., sensor data) from the devices in accordance with the corresponding service logic 202. A runtime manager 240 may also utilize service logic 202 and provide received data as inputs to the logic and use the service logic 202 to generate results, including results which may be used to prompt certain actuators on the deployed devices. In some cases, the generation of these results may include utilizing remotely executed service logic, for instance, by sending a request to a backend service Runtime manager logic 240 may also be utilized in connection with security management logic 245, to define security domains within a deployment, for instance, to secure communications between one or more of the deployed devices and a gateway and/or communications between the devices themselves.

Portions of the application, or service logic, can be distributed during deployment, with service logic capable of being executed locally at the gateway (or even one of the deployment computing assets) and/or remote from the deployment location on a cloud-based or other remotely-located system. Indeed, in some cases, the management system 205 (e.g., using runtime manager 240) may provide one or more assets or their host devices (e.g., 105*a,b*) with service logic for use during an IoT application's deployment. In some cases, the management system 205 (and runtime manager 240) may manage deployment and execution of multiple different applications (e.g., with corresponding sets of service logic 202). Different configurations (e.g., using different configuration data instances) of the same application may also be supported by a single management system (or gateway). Once assets are provisioned, the deployed assets can be used collectively for achieving the goals and functionality designed for the application.

In some IoT applications, one or more UI assets may be defined, and devices may be deployed within a deployment of the IoT application to provide one or more UIs to facilitate runtime management of the deployment. In some cases, UI logic and functionality may already be present on a UI asset (e.g., of a user device or other user interface platform (e.g., a smart home control monitor), etc.), while in other cases UI logic may be provisioned on a selected asset on-demand by the management system to supplement or to be used by UI logic and functionality already on the device. For instance, UI models (e.g., 206) may define various types of UIs and UI features which may be provisioned on UI assets in connection with an IoT application deployment. IoT application UIs may include graphical user interfaces (GUIs) through which a user receives outputs and/or provides inputs (e.g., through a touchscreen), voice interfaces (through which voice commands can be received), gesture-based interfaces (e.g., utilizing a camera to capture user gestures), audio interfaces (e.g., through which data is presented via speakers on a device), among other examples. A UI model can provide logic to assist in the implementation of any one of such UIs.

As noted above, user devices (e.g., 130) may be utilized in a variety of ways within an IoT application deployment. User devices may possess management system functionality, functionality of an IoT service development system (e.g., 210), may be utilized to control or manage a particular IoT application (e.g., through a UI of the IoT application provided on the device 130), or to provide other assets (e.g., sensor, actuator, computing, or storage) for use in a particular IoT application deployment. In one example, a user device 130 may include a UI engine 265, which may be leveraged in a particular IoT application deployment to provide one or more UIs for use by a user in connection with the deployment. A user device 130 may include one or more data processors (e.g., 266), one or more memory elements (e.g., 268), a communication module 270 enabling communication with other systems using wireless and/or wireline network connections, and an operating system 272 on which one or more applications (e.g., 274) may be run. A user device 130 may include one or more input devices 276, which may embody sensors implementing a touchscreen interface, keyboard, tracker ball, camera, or other mechanism through which user inputs may be captured. A user device 130 may also include one or more presentation devices 278 (e.g., driven by corresponding actuators) to implement a graphical display, an audio presentation (e.g., speakers), a light output (e.g., of an integrated LED flashlight or camera flash), or vibration motor to output vibration-based signals, among other examples. Input devices and presentation devices, together with UI engine 265 driving operation of these devices) and storage (e.g., 268) and computing (e.g., 266) resources of a user device (e.g., 130) may be utilized to fulfill UI requirements of a particular IoT application, resulting in the deployment of a user device (e.g., 130) in connection with deployment of the particular IoT application.

As noted above, asset abstraction can assist not only in easing the deployment of a system and propagating configurations across multiple different systems, but abstraction may also be used to enhance the programming of IoT applications. For instance, a development system 210 may be provided, through which a user may define and create a new IoT application, or service. The development system 210 may be provided with traditional textual and/or graphical programming tools (e.g., for use in coding the application) and enhanced with declarative programming tools allowing users, including novice programmers, to program a service by specifying generalized or abstracted requirements of the IoT application, expressed as collections of asset taxonomies. The user may additionally declare relationships between two or more of the selected taxonomies to indicate input-output, sensor-actuator, or other relationships that are to be automatically defined in corresponding application code and thereby develop new IoT applications (and corresponding service logic (e.g., 202) based on these abstractions. Such a development paradigm may allow an IoT application to be programmed once and deployed theoretically anywhere (in varying environments using varying combinations of devices).

In one example, a development system 210 can include one or more processors 246 and one or more memory elements 248 utilized to implement a development engine 250. In some cases, the development system 210 can be integrated with a user device (e.g., 130) and/or management system (e.g., 205). The development engine 250 can provide an interface through which a user may generate service logic 202 corresponding to an IoT application to be deployed in one or more environments. The development engine 250 may include a requirement definition 255 component to allow users to define the service, at least in part, by defining a set of asset requirements and relationships between the asset requirements. Asset requirements may be defined according to asset abstractions (e.g., built from a library of asset abstraction definitions 260) and allow a user to define the service according to capability abstractions, which in turn, during deployment, may be translated into resource abstractions, which may map to real devices discovered (e.g., by the deployment manager 215) during a particular deployment of the service. Some of the asset abstraction definitions 260 may include UI asset abstractions to further allow users to define UI requirements for a service created using the development engine 250. The resulting service logic (e.g., 202) may likewise allow UI platforms to be deployed together with the remaining IoT application deployment in an ad hoc and impromptu manner (e.g., based on the present set of available devices and assets discoverable by a management system (e.g., 205) in connection with a given deployment. Indeed, as a general manner, IoT services may be developed using asset abstraction definitions through development system 210 in advance of and independent of the identities of the physical devices that will be used to implement the service, and the physical deployments may be later and automatically deployed based on the defined abstractions in the corresponding service logic.

Continuing with the description of FIG. 2, each of the IoT devices (e.g., 105*a,b*) may include one or more processors (e.g., 284, 285), one or more memory elements (e.g., 286, 287), and one or more communications modules (e.g., 288, 290) to facilitate their participation in various IoT application deployments. Each device (e.g., 105*a,b*) can possess unique hardware, sensors (e.g., 110*a,c*), actuators (e.g., 115*a*), and other logic (e.g., 292, 294) to realize the intended function(s) of the device (including operation of the respective sensors and actuators). For instance, devices may be provided with such resources as sensors of varying types (e.g., 110*a*, 110*c*), actuators (e.g., 115*a*) of varying types, energy modules (e.g., batteries, solar cells, etc.), computing resources (e.g., through a respective processor and/or software logic), security features, data storage, and other resources.

Figure 3A:
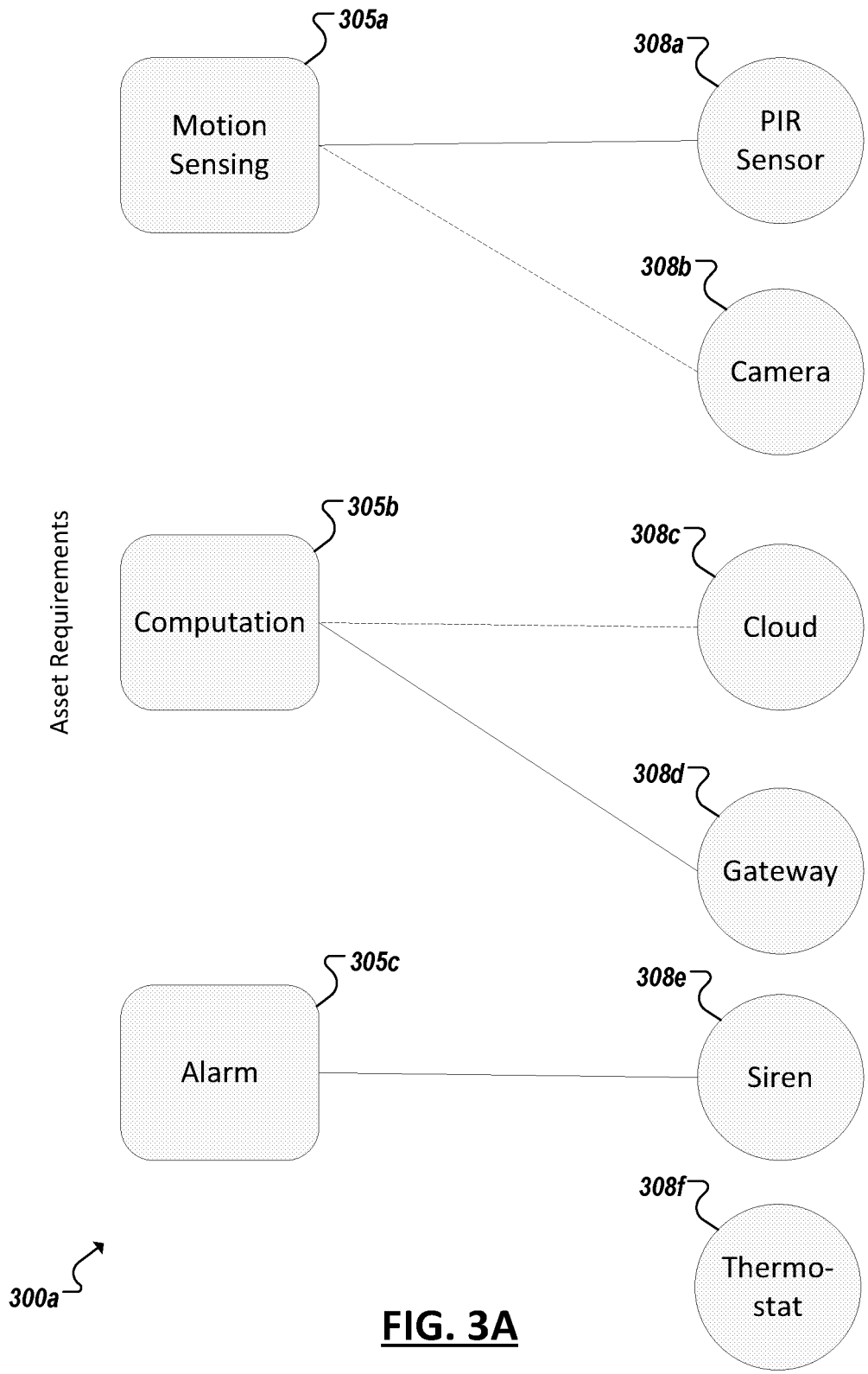
FIG. 3A is a simplified block diagram illustrating an example of asset abstraction and binding.

Turning to FIG. 3A, a simplified block diagram 300*a* is shown representing a simplified example of asset abstraction. A variety of different taxonomies can be defined at varying levels. For instance, a sensor taxonomy can be a parent to a multitude of specific sensor-type taxonomies (e.g., child taxonomies for light sensing, motion sensing, temperature sensing, liquid sensing, noise sensing, etc.), among other examples. In the example of FIG. 3A, an IoT application has been defined to include three asset requirements, represented by taxonomies Motion Sensing 305*a*, Computation 305*b*, and Alarm 305*c*. During asset discovery, a variety of assets (e.g., 308*a-f*) can be identified as usable by the application (e.g., based on the assets meeting one or more defined discovery conditions). One or more corresponding taxonomies, or abstractions, can be identified (e.g., by an IoT management system) for each of the assets 308*a-f*. Some of the abstractions may not have relevance to the asset requirements and function of the application, such as an abstraction (e.g., Temperature Sensor and/or HVAC Actuator) determined for thermostat device 308*f*. Other asset abstractions may match the abstractions (e.g., 305*a-c*) designated in the IoT application as asset requirements of the application. Indeed, more than one discovered asset may be fit one of the asset requirements. For instance, in the example of FIG. 3A, a PIR sensor 308*a* and camera 308*b* are each identified as instances of a motion sensing asset taxonomy 305*a*. Similarly, a cloud-based computing resource 308*c* and network gateway 308*d* are identified as instances of a computation asset taxonomy 305*b*. In other instances, there may be just a single discovered device satisfying an application asset requirement (e.g., siren 308*e* of the alarm taxonomy 305*c*), among other examples.

Conventionally, IoT and wireless sensor network (WSN) applications have been developed to intricately define data-flow among a determined set of physical devices, which involves device-level discovery in development time to obtain and hardcode the corresponding device identifiers and characteristics. By utilizing asset abstraction, development can be facilitated to allow the devices to be discovered and determined at runtime (e.g., at launch of the application), additionally allowing the application to be portable between systems and taxonomy instances. Further, development can be expedited by allowing developers to merely specify asset requirements (e.g., 305*a-c*), without the necessity to understand radio protocol, network topology, and other technical features.

In one example, taxonomies for asset abstraction can involve such parent taxonomies as sensing assets (e.g., light, presence, temperature sensors, etc.), actuation (e.g., light, HVAC, machine controllers, etc.), power (e.g., battery-powered, landline-powered, solar-powered, etc.), storage (e.g., SD, SSD, cloud storage, etc.), computation (e.g., microcontroller (MCU), central processing unit (CPU), graphical processing (GPU), cloud, etc.), and communication (e.g., Bluetooth, ZigBee, WiFi, Ethernet, etc.), among other potential examples. Discovering which devices possess which capabilities (and belong to which taxonomies) can be performed using varied approaches. For instance, some functions (e.g., sensing, actuating, communication) may be obtained directly from signals received from the device by the system management system via a common descriptive language (e.g., ZigBee's profiles, Bluetooth's profiles and Open Interconnect Consortium's specifications), while other features (e.g., power, storage, computation) may be obtained through deeper queries (utilizing resources on top of the operating system of the queried device or through queries to a remote service), among other examples.

Asset binding can be applied to determine which discovered assets (fitting the asset requirements (abstractions) defined for an application) are to actually be deployed. Criteria can be defined at development time and/or before/at runtime by the application's user, which an IoT deployment manager (e.g., 205) can consult to perform the binding. For instance, as shown in FIG. 3A, according to the criteria set forth for the application (or for a particular session using the application), one of multiple matching assets for a required taxonomy can be selected. For instance, between PIR sensor 308*a* and camera 308*b*, corresponding criteria (e.g., criteria to be applied generally across all taxonomies of the application and/or taxonomies specific to the motion sensing taxonomy 305*a*) can result in PIR sensor 308*a* be selected to be deployed to satisfy the motion sensing asset requirement 305*a* of the application. Similarly, criteria can be assessed to determine that gateway 308*d* is the better candidate between it and cloud resource 308*c* to satisfy the application's computation requirement 305*b*. For asset requirements (e.g., 305*c*) where only a single discovered instance (e.g., 308*e*) of the asset taxonomy is discovered, asset binding is straightforward. Those discovered devices (e.g., 308*a*, 308*d*, 308*e*) that have been selected, or bound, can then be automatically provisioned with resources from or configured by the IoT deployment manager (e.g., 205) to deploy the application. Unselected assets (e.g., 308*b*, 308*c*, 308*f*) may remain in the environment, but are unused in the application. In some instances, unselected assets can be identified as alternate asset selections (e.g., in the event of a failure of one of the selected assets), allowing for swift replacement of the asset (deployed with the same settings designated for instances of the corresponding taxonomy).

In some instances, asset binding can be modeled as a bipartite matching (or assignment) problem in which the bipartite graph can be expressed by G=(R,A,E) where R denotes the asset requirements, A denotes the available assets and e=(r,a) in E where a in A is capable of r in R. Note that if R requests for n instances of a particular assets, A' can be defined as:

$$\bigcup_n A$$

from which a solution for the (maximum) (weighted) matching problem can be computed. For instance, exhaustive search can be applied as the number of vertices in the bipartite graph are small and the edges are constrained in the sense that there is an edge (r,a) only if a is capable of r.

Figure 3B:
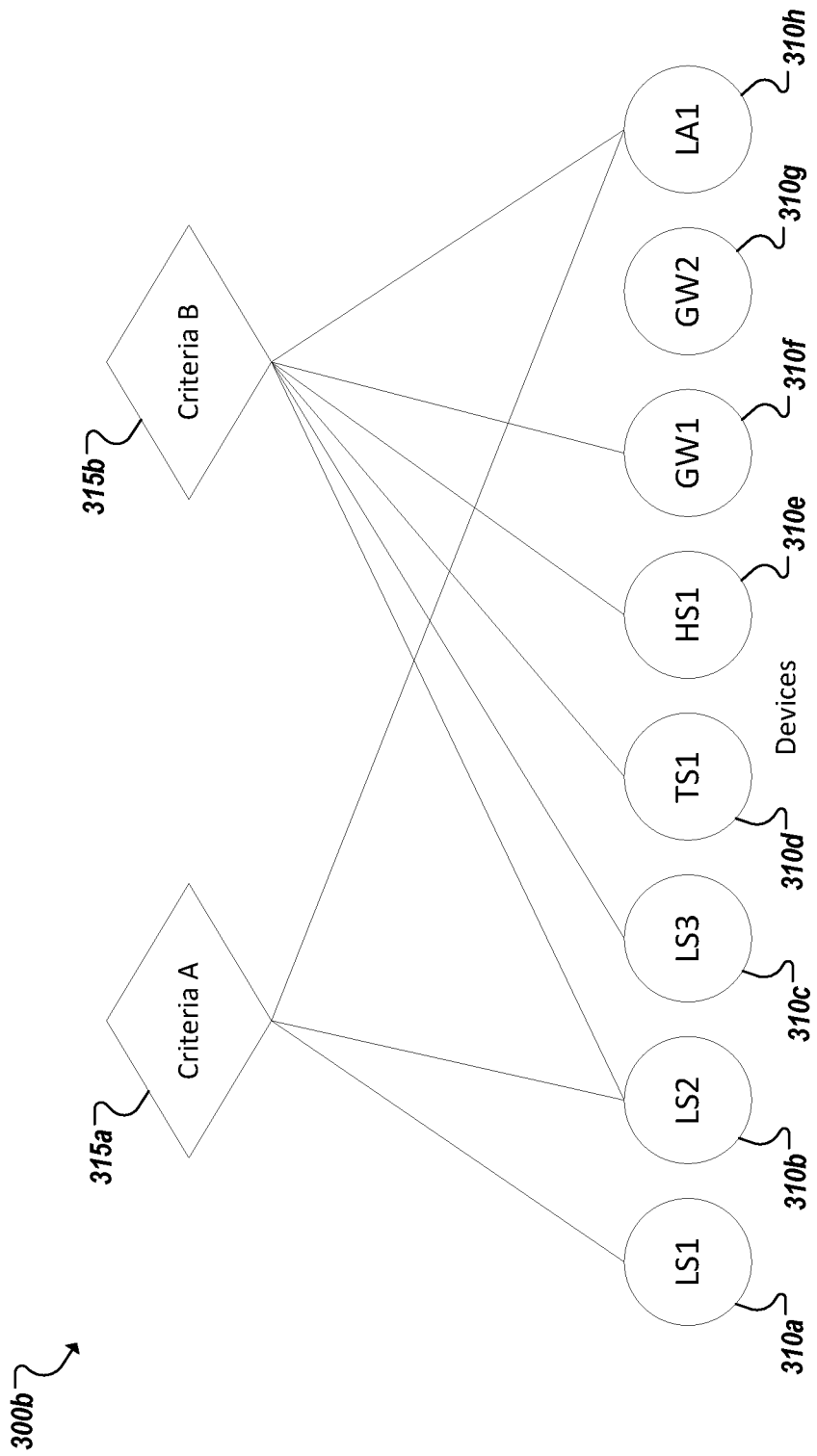
FIG. 3B is a simplified block diagram illustrating an example of asset discovery.

Turning to the simplified block diagram 300b of FIG. 3B, an example of asset discovery is represented. Asset discovery can allow the scope of available devices to be confined based on discovery conditions or criteria, such as conditions relating to device proximity, room, building, movement state, movement direction, security, permissions, among many other potential (and configurable) conditions. The benefits of such targeted discovery can trickle down to asset binding, as unchecked discovery may return many possible bindings, especially in large scale deployment. For example, in a smart factory, the action of "deploying predictive maintenance" may be ambiguous as there may be hundreds of sensors, motors, alarms, etc. in a factory facility. Asset discovery, in some implementations, takes as input a policy or user input from which a set of discovery criteria can be identified. Upon detecting the universe of assets with which the application could potentially operate, the criteria can be used to constrain the set, in some cases, providing a resulting ordered list of available assets, which can be expressed as f:C×D→D, where C denotes criteria, D denotes a set of devices, and the codomain is a totally ordered set.

For instance, in the example of FIG. 3B, two discovery criteria 315a, 315b are identified for an application. Additional criteria may be defined that is only to apply to some or a specific one of the categories, or taxonomies, of assets, among other examples. Based on the defined criteria 315a-b in this example, the output of discovery according to search criteria A 315a leads to the codomain of a subset of devices in the environment—LS1 (310a), LS2 (310b), GW2 (310g) and LA1 (310h), whereas search criteria B results in LS2 (310b), LS3 (310c), TS1 (310d), HS1 (310e), GW1 (310f), and LA1 (310h). Based on the set of defined discovery criteria (e.g., 315a-b), asset discovery can attempt to reduce the total collection of identified assets to a best solution. Additionally, determining the set of discovered assets for binding consideration can incorporate determining a minimum set of discovered devices, based on the asset requirements of the application. For instance, a minimum set can be selected during discovery such that at least one asset of each required taxonomy is present in the set, if possible. For instance, in the example of FIG. 3B, it can be identified (e.g., by an asset discovery module of the deployment manager) that application of only criteria B (315b) in discovery yields at least one asset for each of the taxonomies defined for the application.

Figure 3C:
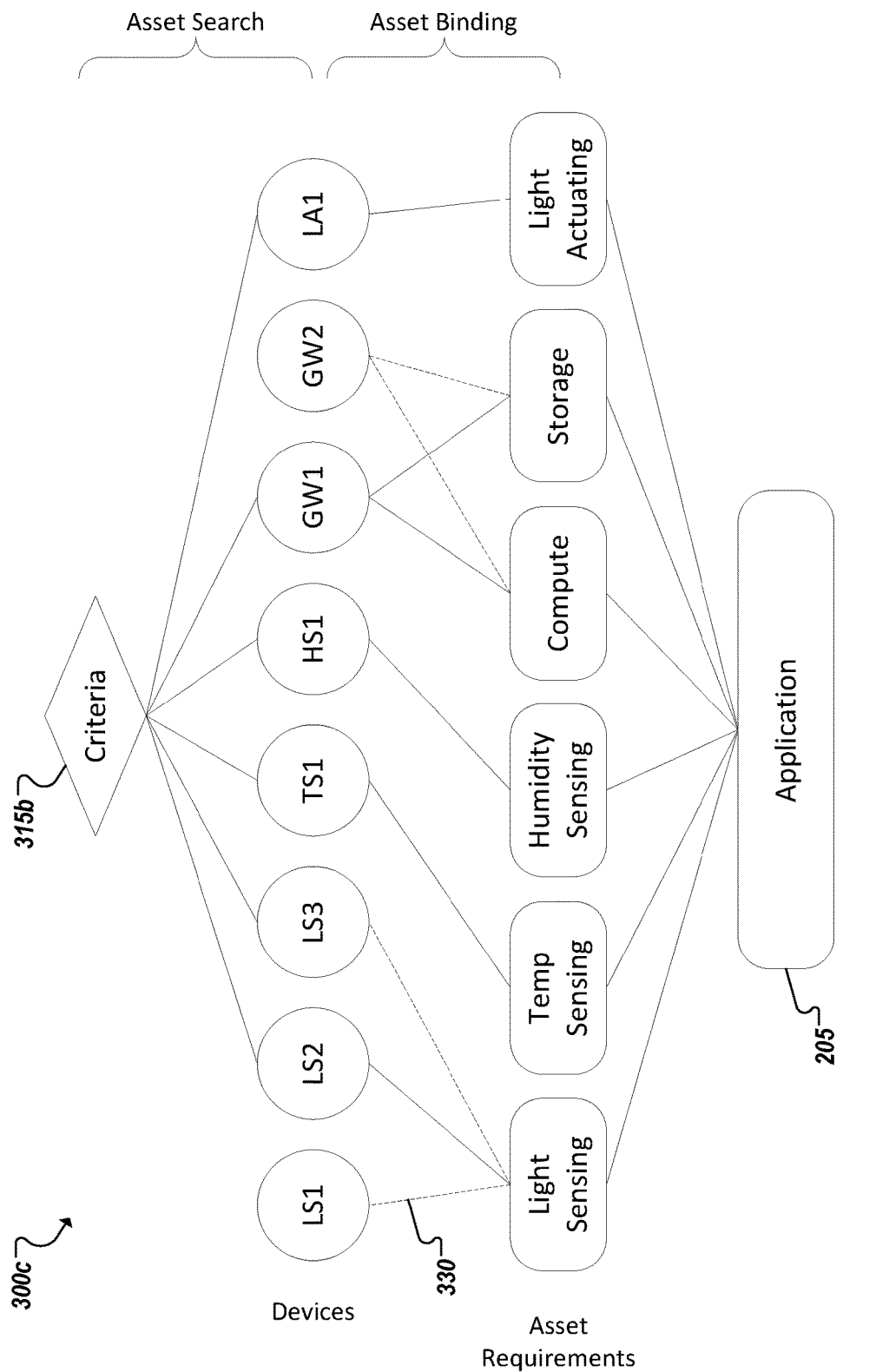
FIG. 3C is a simplified block diagram illustrating an example of asset abstraction and binding using a discovered set of assets.

For instance, the block diagram 300c FIG. 3C illustrates the end-to-end deployment determinations of a deployment manager for a particular IoT application 350. For instance, based on the discovery conducted in the example of FIG. 3B, a subset of the assets (e.g., LS2 (310b), LS3 (310c), TS1 (310d), HS1 (310e), GW1 (310f), and LA1 (310h)) are "discovered" for potential use by the application (e.g., based on their compliance with criteria B (and the underrepresentation of assets in compliance with criteria)). Accordingly, assets LS1 and GW2 are not to bound to the corresponding IoT application 350 (as indicated by the dashed lines (e.g., 330)), despite each asset being an instance of one of the asset requirements (e.g., Light Sensing, Compute, and Storage) of the application 350.

As noted above, additional criteria can be defined and applied during asset binding. During binding, where the set of discovered assets include more than one instance of a particular required asset taxonomy (e.g., as with assets L2 and L3 in asset taxonomy Light Sensing), criteria can be applied to automatically select the asset that is the better fit for deployment within the IoT system governed, controlled, or otherwise supported by the application 350. Further, as illustrated in FIG. 3C, it is possible for a single asset instance (e.g., GW1) to both belong to two or more taxonomies and to be selected for binding to the application for two or more corresponding asset requirements (e.g., Compute and Storage), as shown. Indeed, a binding criterion can be defined to favor opportunities where multiple asset requirements of the application can be facilitated through a single asset, among other examples.

As represented generally in FIG. 3C, asset discovery can provide the first level for confining the scope of an asset-to-application asset requirement mapping. A user or developer can specify (jn some cases, immediately prior to runtime) the asset requirements for a particular application 350, and an environment can be assessed to determine whether assets are available to satisfy these asset requirements. Further, the deployment manager utility can automatically deploy and provision discovered assets to implement that application, should the requisite combination of assets be found in the environment. Additionally, the deployment manager utility can automatically apply setting values across the deployed assets in accordance with a configuration defined by a user associated with the application. However, if no instances of one or more of the asset requirements (required taxonomies) are discovered, the application may be determined to be un-deployable within the environment. In such cases, a deployment manager utility can generate an alert for a user to identify the shortage of requested taxonomy instances, including identifying those taxonomies for which no asset instance was discovered within the environment, among other examples.

Figure 4A:
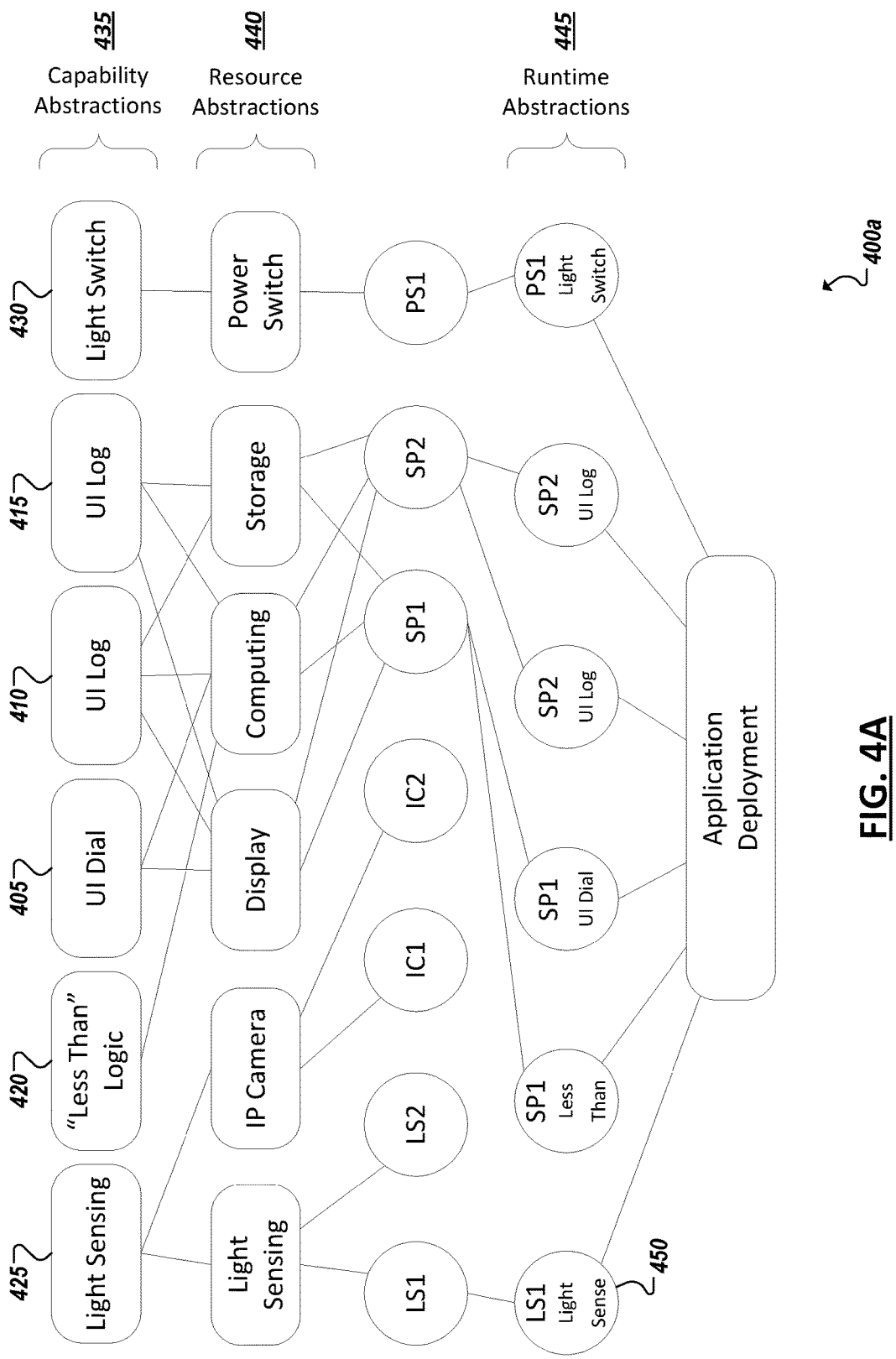
FIGS. 4A-4B are block diagrams representing abstraction layers of an example machine-to-machine application deployment.
Figure 4B:
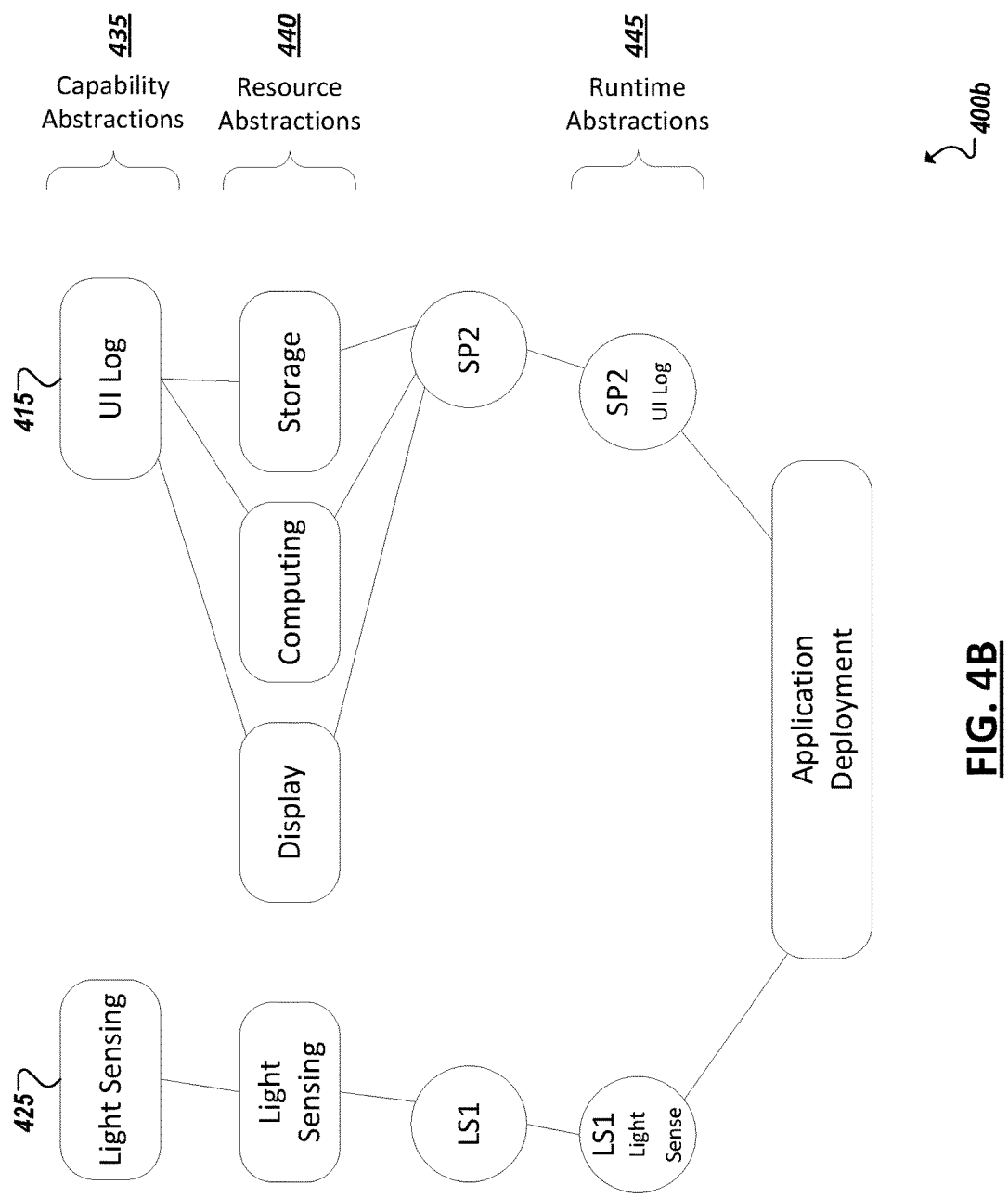

Turning to FIGS. 4A-4B, simplified block diagrams 400a-b are shown representing example IoT abstraction layers used in one implementation of an IoT application (pre- and post-deployment). For instance, in the example of FIG. 4A, the abstractions may include UI abstractions (e.g., 405, 410, 415), as well as logic execution abstractions (e.g., 420), sensor abstractions (e.g., 425), and actuator abstractions (e.g., 430), among other examples. Various abstraction layers may be defined including a capability abstraction layer 435, a resource abstraction layer 440, and runtime abstraction layer 445. The capability abstraction layer 435 may be utilized during programming of a service, with each capability abstraction corresponding to a capability or functionality that is to be incorporated in an IoT service. Each capability abstraction may further map to one or more resource abstractions in a resource abstraction layer 440. Each resource abstraction may correspond to a type or category of asset (abstracting the precise device model, MAC, serial number, etc.), such as a light sensor, IP camera, display, computing resource, storage resource, power switch, microphone, temperature sensor, smart thermostat, etc.

During deployment of the service, a management system may determine a mapping between capability abstractions and the resource abstractions which map to the capability abstraction. In other cases, the service logic generated from the capability abstractions selected during development may include or derive the mapping and execution of the service logic may cause the resource abstractions to be identified to the management system, among other example implementations. The management system may utilize resource abstractions during asset discovery to determine which assets potentially satisfy the requirements (e.g., specified by the capability abstractions) of the corresponding IoT application. As noted above, asset binding may involve the management system selecting one of potentially multiple satisfactory assets for a particular resource abstraction. For instance, in the example of FIG. 4A, a Light Sensing capability 425 may map to two potential resource abstractions, Light Sensors and IP Cameras. Two light sensors, L1 and L2, may be discovered in an environment (by a management system) together with two distinct IP cameras (e.g., IC1, IC2). The management system, in this particular example, selects light sensor L1 for the deployment (e.g., based on one or more binding criteria), and the selected light sensor L1 is mapped to the runtime abstraction Light Sense 450. Upon selecting (and binding) specific, discovered devices, the service logic may interact with the selected asset by reference to its respective runtime abstraction (in runtime abstraction layer 445). Each runtime abstraction may correspond to one of the capability abstractions defined for the IoT application, and may represent the runtime, post-deployment view of the IoT service vis-à-vis the deployed assets.

IoT solutions typically define IoT resources as atomic resources, in that each capability maps to a single type of device. However, some capabilities may be between defined through a recognition that a single capability is, in fact, realized through multiple different resources in combination (or a "compound" of resources). Other capabilities may remain realized by a single atomic resource. In the context of various UI capabilities, a UI capability may be defined as a compound of resources. For example, as shown in the partial view of the mapping 400a shown in FIG. 4B, the capability abstraction 405, "UI Log," may map to three resource abstractions (i.e., a compound resource), namely Display, Computing, and Storage. In other words, a one-to-many relationship may exist between a capability abstraction and corresponding resource abstractions. For atomic resources, such as for a Light Sensing capability abstraction 425, a one-to-one capability-to-resource mapping may be made. When binding discrete physical devices, or assets, to resource abstractions, a single device (such as smartphone SP2) may map to multiple resource abstractions. Indeed, a single device may satisfy a compound resource, such as shown in the example of FIG. 4B.

In the example of FIG. 4A, three UI capability abstractions are included in an example IoT service definition. For instance, a UI Dial capability abstraction may be provided that identifies a desire for the IoT application deployment to include a UI input realized through a dial-like UI element (e.g., a WYSIWYG dial for adjusting a particular value used in the IoT service). In this example, to implement the UI Dial capability, a touchscreen resource and a computing resource may be utilized and, in some cases, within an all-in-one device, which can be expressed as follows:

$$C_{UI_{dial}} \cong \{r_{computing}, r_{display}\} \in C_{UI_{IN}}$$

where $C_{UI_{dial}}$ denotes the capability of UI Dial, $C_{UI_{IN}}$ denotes UI Input (the collection of all UIs for input) and $r_{computing}$, $r_{display}$ represent the resources of computing and display, respectively. Other UI input capabilities may be defined according to a similar basis, with each distinct UI input capability representing a particular style or type of input GUI element (e.g., dial, switch, button, slider, among potentially limitless other varieties). Output UI capabilities may be likewise diverse in variety and may be generally defined similar to output UI capability UI Log:

$$C_{UI_{log}} \cong \{r_{computing}, r_{storage}, r_{display}\} \in C_{UI_{OUT}}$$

where $C_{UI_{log}}$ denotes the capability of UI Log, $C_{UI_{OUT}}$ denotes UI Output (the collection of all UIs for output) and $r_{computing}$, $r_{storage}$, $r_{display}$ represent the resources of computing, storage and display, respectively. Other output UI capabilities (different from a log-style UI output) may also be defined and included in a library of capability abstractions from which an IoT service may be defined and developed. Further, while the examples in FIG. 4A-4B show display-centric UI capability abstractions, in some implementations, UIs may include non-display UIs, such as UIs that utilize voice/speech recognition technology, audio output, gesture recognition, tactile or vibration outputs, among other UI examples.

Figure 5A:
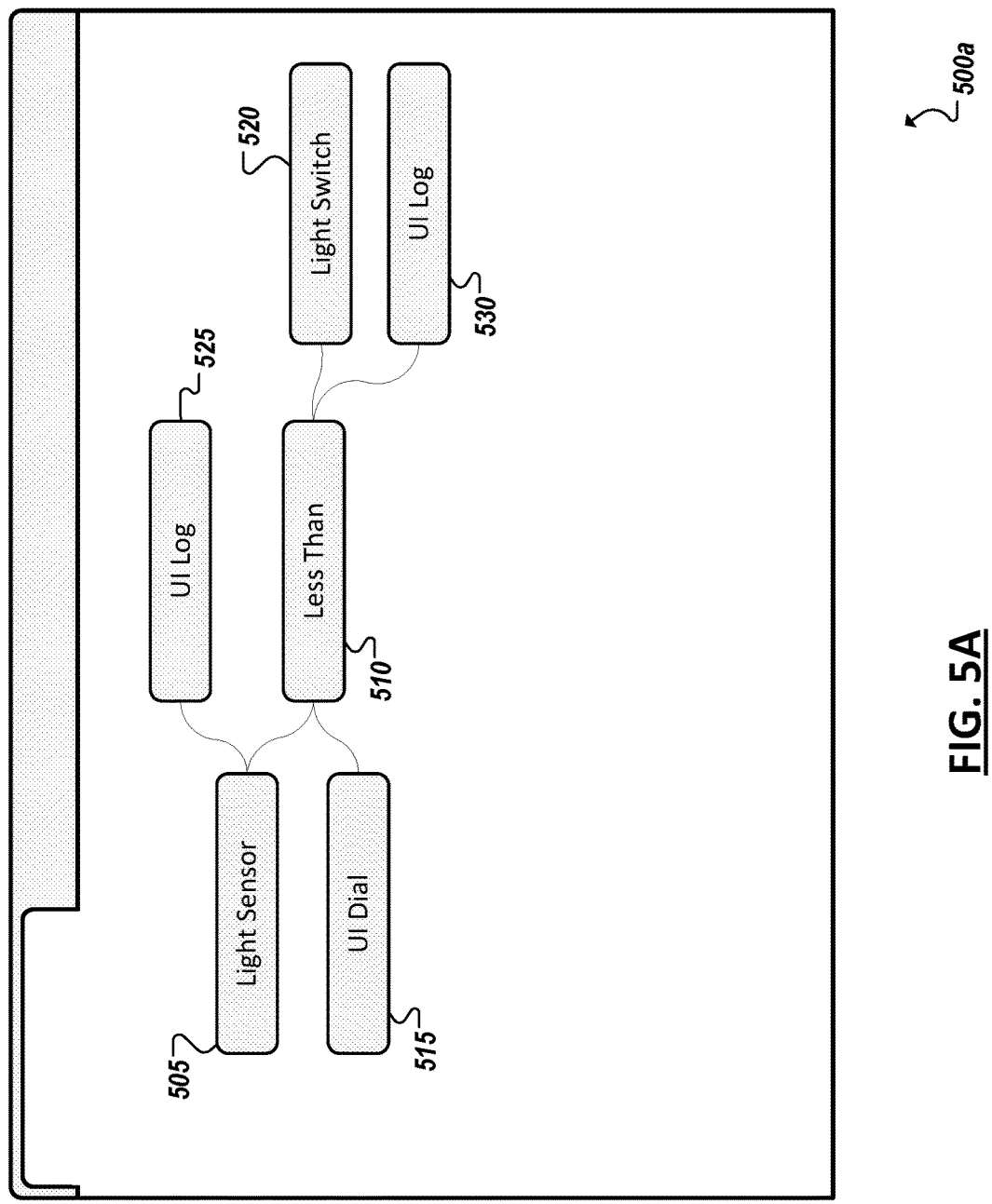
FIG. 5A is a screenshot of an example graphical development tool for creating new machine-to-machine services.

As noted above, asset abstractions in the capability abstraction layer 430 may be utilized during pre-deployment time, or development time, in the creation of an IoT service. For instance, as illustrated in the example screenshot 500a of FIG. 5A, an IoT service development tool may support graphical development of an IoT service. For instance, a user may select (e.g., from a library of capability abstractions) various graphical blocks (e.g., 505, 510, 515, 520, 525, 530) corresponding to various capability abstractions (and capabilities), which the user desires to include within the IoT system, and drag and drop these blocks into a development window 535. The user may additionally draw or otherwise define connectors between the blocks to define relationships and interactions between the various selected blocks (e.g., 505, 510, 515, 520, 525, 530). For instance, in the particular example of FIG. 5A, a smart lighting control service is being developed (with capabilities similar to those shown in the example illustrated in FIGS. 4A-4B), with a light sensor capability 505 being linked to a logical execution capability 510, which performs a comparison between a value measured by the light sensor capability 505 with a threshold value defined by a UI input capability 515 (set using a dial UI element). In conventional systems, the threshold value may be determined and set as a constant during programming of the IoT service. In the example of FIG. 5A, however, a UI is provided for deployments of the IoT service to allow this threshold value to be modified post-deployment by a user. The logic execution capability 510 may then provide a result of its comparison to a light switch capability 520. Additional UI capabilities 525, 530 may be provided to facilitate UI outputs and provide a log that records light sensor values (e.g., at 525) and results (e.g., true/false, on/off, etc.) of logic execution capability 510, among other examples.

Logic execution capabilities 510, like UI capabilities, can take many (potentially limitless) forms specific to the corresponding IoT service being defined. Indeed, a logic execution capability (e.g., 510) may embody some of the service logic that it utilized to define a function, calculation, or processing step that is to be performed on data generated by one or more sensor capabilities and potentially provided to actuator assets to realize one or more actions or activities of the IoT service (e.g., automating the turning on of a light). For instance, a logic execution capability may provide pre- or post-processing of sensor data and/or inputs received through UI assets, including processing of multiple values returned in data generated by one or more other assets in the IoT service.

Figure 5B:
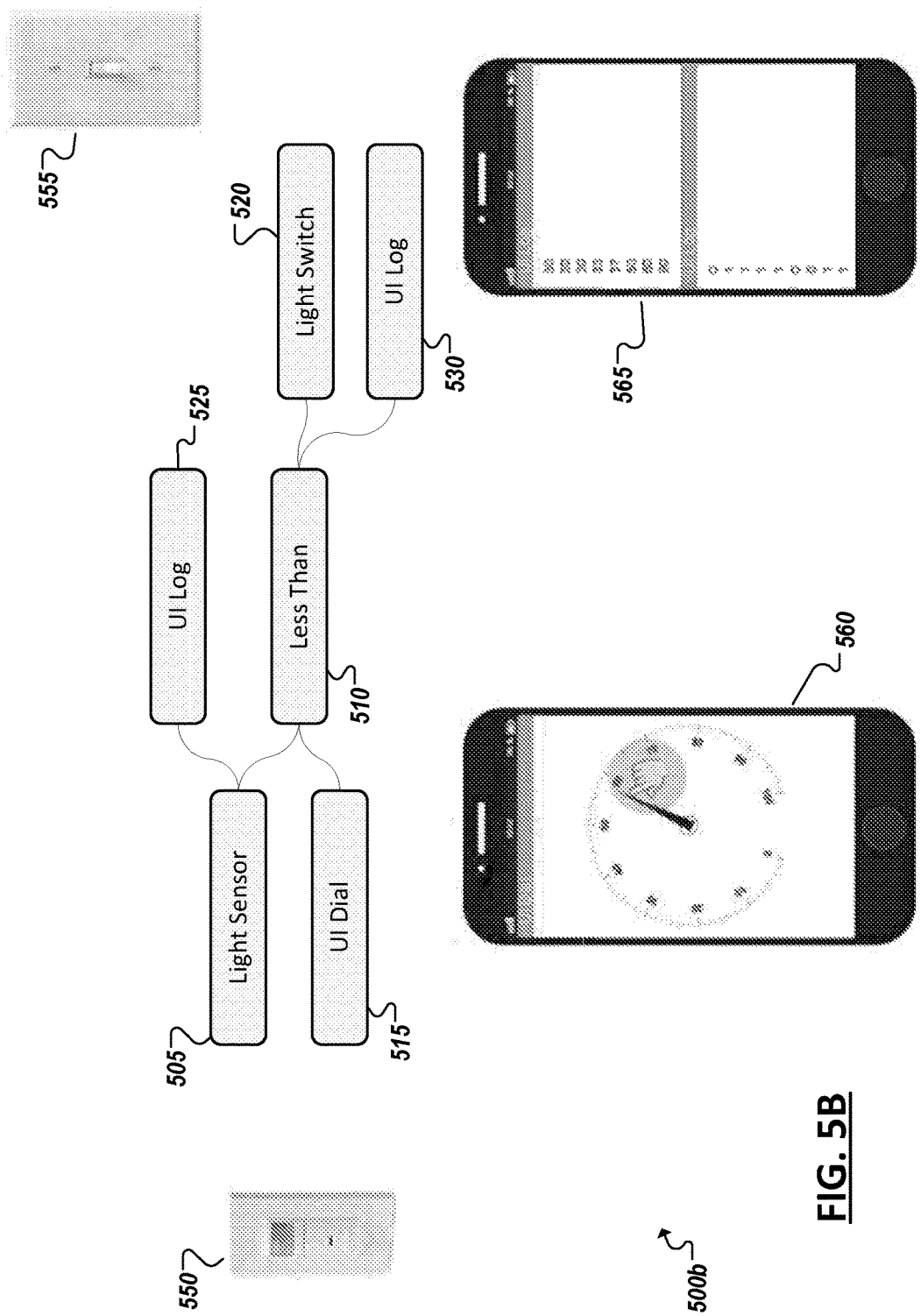
FIG. 5B is a simplified block diagram illustrating an example deployment of a new machine-to-machine service.

Using a graphical programming (or a textual programming) paradigm, a user may define the capabilities of a new IoT service together with relationships between the capabilities using capability abstractions, as shown in the example of FIG. 5A. Service logic may be generated by the programming tool to embody the capabilities. This service logic may then be used in any number of different, automated deployments of the corresponding IoT service (using potentially many different combinations of devices satisfying the capability abstraction requirements of the IoT service). For example, as illustrated in the block diagram 500b of FIG. 5B, one example deployment of a service corresponding to the example service developed based on the graphical programming represented in FIG. 5A, may result in the binding of a particular light sensor device 550 to a light sensing capability (e.g., 505) defined in the service and an automated light switch 555 may be bound to a light switch capability (e.g., 520) defined in the service. A first smartphone device 560 may be selected as including the display, computing, and storage resources mapped to the "UI Dial" UI capability and "Less Than" logic execution capability abstractions (e.g., as shown in FIG. 4A), while a second smartphone device 565 is selected as providing the display, computing, and storage resources mapped to the "UI Log" capability abstractions defined for the IoT service. In other cases, a single smartphone may be selected to replace the two separate smartphones selected in this particular example, so long as the single smartphone includes the resources satisfying the resource abstraction requirements mapped to the IoT service's respective capability abstractions (e.g., UI Dial, UI Log, "Less Than" Logic, etc.).

Figure 6:
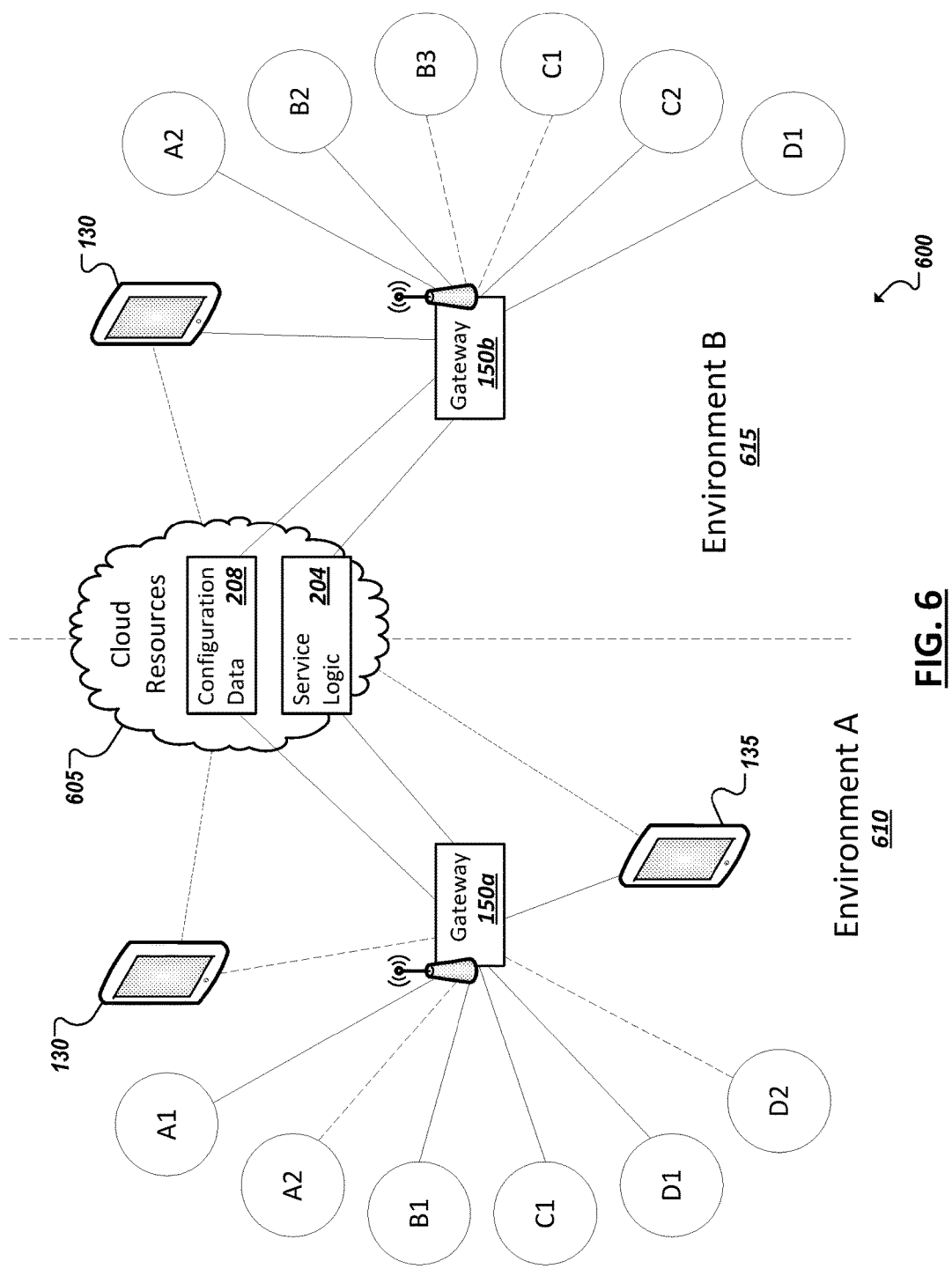
FIG. 6 is a simplified block diagram illustrating an example of managing application of configuration settings between two instances of a particular machine-to-machine system.

Turning to FIG. 6, as noted above, an application developed according to the principles of asset abstraction, as described herein, can allow a given IoT application to be deployed in a number of locations employing varied collections of IoT devices and assets. Such IoT applications, or services, may be deployed spontaneously in response to detecting that sufficient assets exist within range of a management system (e.g., on a particular gateway device (e.g., 150a,b). Upon identifying and selecting resources for the deployment, the management system may provide configurations to the selected assets for use in defining characteristics of the assets during a particular deployment of the IoT application. In some cases, different configurations can be employed in different deployments of the same IoT applications, leading potentially, to different outcomes in each deployment (including in deployments that are otherwise identical (e.g., using the same combination of IoT devices in a comparable environment)). In other cases, the same configurations can be employed in distinct deployments that utilize different combinations of devices (e.g., different devices bound to at least some of the defined abstractions of the IoT application) to yield comparable outcomes, even when the devices used are not identical. As an example, a user can define preferred settings in a particular configuration for a particular IoT application and cause different deployments of the particular IoT application (in other locations) to also adopt the user's preferred settings when they are deployed. For instance, frequent travelers may prefer to create a home-like environment (e.g., in a hotel, office, or vacation rental remote from their home) by causing particular configuration data defined by the user (e.g., hosted on a cloud 605) to be applied to each environment in which deployable devices exist. Accordingly, the particular configuration data (e.g., 204) can be used to deploy multiple instances of an IoT application (with potentially different devices) all with the same settings.

For instance, as shown in the simplified block diagram 600 of FIG. 6, in a first environment 610, a first gateway 150a can be utilized to deploy a first instance of a particular IoT application. Service logic (e.g., 204) to implement the IoT application may be hosted on gateway 150a and/or remotely by an application server or other system(s) providing cloud resources (e.g., 605). In one example, a smartphone 130 (or other device) may enter the first environment 610 and communicate with a corresponding gateway 150a to indicate that a first set of configurations should be employed in a deployment of an IoT application in the first environment 610. For instance, the gateway 150a may deploy the IoT application in the first environment 610 by discovering a set of assets A1, A2, B1, C1, D1, D2, where assets A1 and A2 are instances of taxonomy A, asset B1 is an instance of taxonomy B, and so on. Further the same (or a different) smartphone may also be detected as providing resources to satisfy one or more UI capabilities defined for the IoT application. In this example, another smartphone 135 is selected to satisfy the resources required for one or more UI (input and/or output) capabilities defined for the IoT application, while smartphone 130 is not selected for inclusion in the deployment in environment A 610. For the remaining capability abstractions of The IoT application, such as capability abstractions A, B, C, D, and E, additionally asset selection (or binding) may be performed, resulting in assets A1, B1, C1, D1 and E1 being selected and deployed for the instance of the IoT application deployment in Environment A 610. Additionally, a particular set of configurations (defined in configuration data 208) may be pushed to the selected assets (A1, B1, C1, D1, E1, and smartphone 135) for use in the deployment. In some cases, a UI model, script, or other data may be pushed to the resources (e.g., 135) selected to provide the UI capabilities for the deployment.

In some examples, the use of a particular set of configurations may be based on a request of a user or even the identification (e.g., by the gateway) that a particular user device associated with a user is present in Environment A 405. Accordingly, the gateway can configure an IoT application's particular deployment based on the preferences of a user within the environment, a property owner (e.g., a manager or owner of the environment), according to government or corporate regulations, among other examples. By remotely hosting configuration data, these configurations may be portable in the sense that multiple different management systems (e.g., 150a and 150b) in multiple, different (and potentially remote) environments may attempt to apply the same configurations to different deployments of the same particular IoT application. In other cases, the configurations pushed to the respective assets in each deployment of the particular IoT application (e.g., in Environment A (610) and Environment B (615)) may be different.

Continuing with the example of FIG. 6, In another, remote environment, Environment B (615), an instance of the same IoT application may be deployed by another gateway 150b in another environment 615. A different set of assets may be discovered in Environment B 615 than was used in Environment A 610, resulting in a different set of deployed assets (e.g., A2, B2, C2, D1, and E1) for the IoT application in Environment B 615. Some of the assets in Environment B may be instances of the same asset (e.g., the same device model) discovered in Environment A (e.g., A2, C1, D1). Some assets may not be strongly tied to location, such as assets on a mobile device (e.g., 130, 135) or other mobile device that may be used in both the IoT application deployments in Environments A and B. Despite the deployments being different between the two environments (e.g., 610, 615), when viewed at the asset abstraction level, the deployments may be functional equivalents. Further, the settings utilized in each deployment can be applied equally within each environment 605, 610 by providing the same configurations (from configuration data 204) to each of the respective IoT application deployments. As an example, a sensitivity setting value defined in the configuration data for the taxonomy instance B can be applied equally to each of assets B1 and B2 (and, for that matter, B3, when deployed), allowing the deployment managers of the gateways to attempt to achieve equivalent systems utilizing different collections of assets. While, in practice, the resulting systems may not be functionally identical (as differences between the asset instances (e.g., B1 and B2) may manifest, even when configured with the same settings), implementations of the application in varied environments can be at least approximated with minimal effort of the user.

Further, in the example of FIG. 6, a smartphone device 130 that was not selected for use as a UI resource in a first deployment of an IoT application (e.g., the deployment in Environment A (610)), the same smartphone device 130 (e.g., when moved to another environment and discovered by a corresponding management system (e.g., gateway 150*b*)) may be bound to UI resources (and mapped-to capability abstractions) in other deployments. For instance, the smartphone 130 may be identified, in Environment B by the gateway 150*b*, as the only device having the resources that satisfied one or more of the UI capability abstractions for the IoT application or better satisfied binding criteria established for the IoT application or the particular deployment of the application in Environment B (e.g., as defined in configuration data 208 or service logic 204), among other examples.

Service logic developed using an abstraction-based programming tool may additionally allow new devices to be discovered and included in an application deployment during runtime of the deployment. For instance, a management system may detect that a new device enters a network and may determine the assets available on the new device. The management system, upon detecting that at least some of the assets correspond to resource abstractions mapped to the capability abstractions defined for the application, may communicate with the new device to configure the device (and its assets) for addition to the deployment. Indeed, for UI assets, a new or additional UI may be provided, based on detection of a new device supporting the resources (e.g., display, storage, and computing) defined for a corresponding UI capability abstraction. For instance, in the example of FIG. 6, device 135 may be initially identified and selected for use in satisfying one or more UI capability abstraction requirements of an application in Environment A 610. However, use device 130 may later enter Environment A 610 and be added dynamically as an additional or substitute UI asset. In some instances, where multiple UI capability abstractions are defined for an application, one device (e.g., 135) may be selected to map to the resource requirements of a first one of the UI capability abstractions, while a second one of the devices (e.g., 130) is selected to fulfill the remaining UI capability abstractions. These mappings of devices to capability (and runtime) abstractions may change too, as device enter or exit (or fail) during runtime, with other devices being selected to supplement or replace the deployed devices in response.

Figure 7:
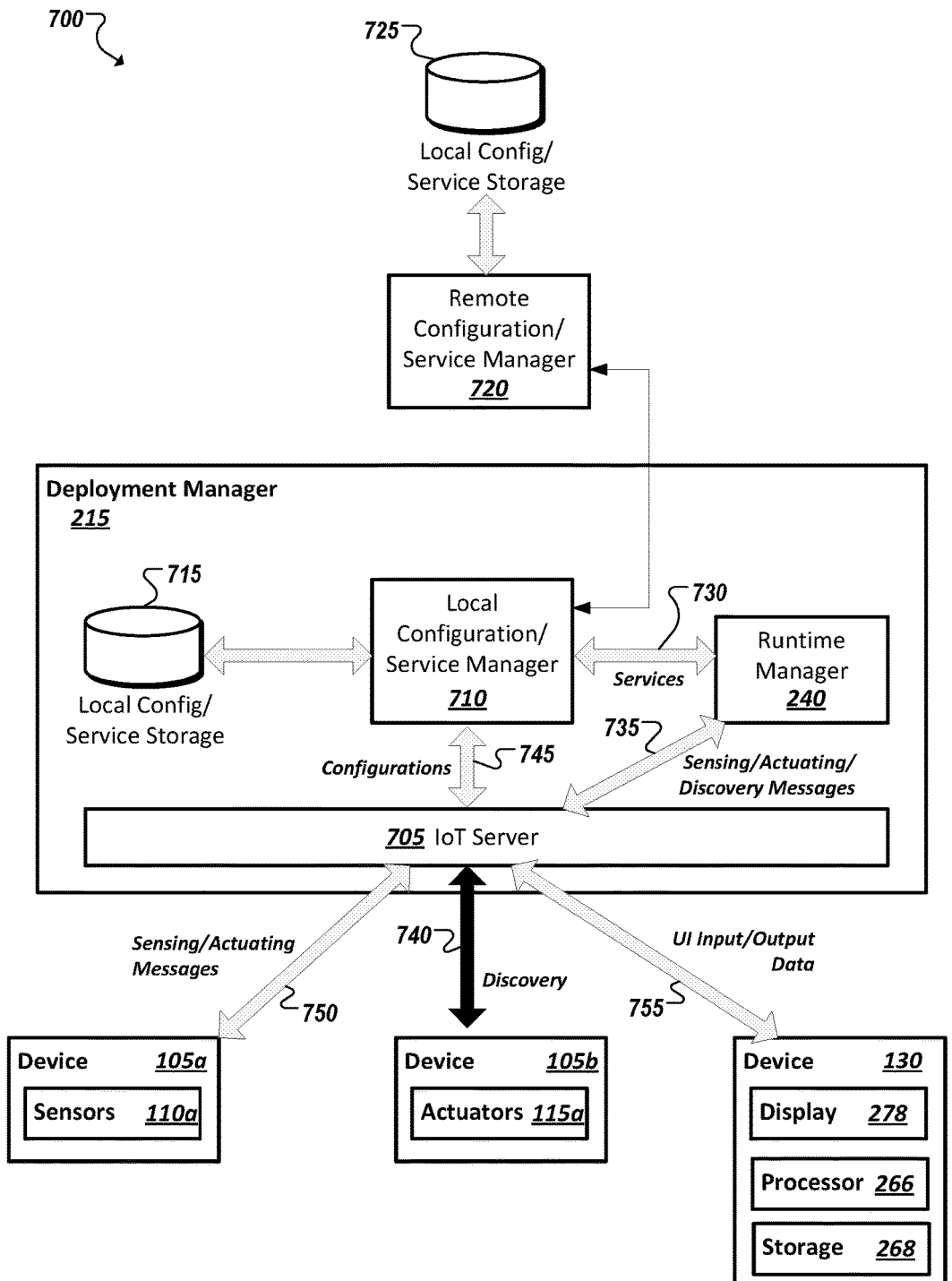
FIG. 7 is a simplified block diagram illustrating an example system used to deploy a particular machine-to-machine system.

Turning to FIG. 7, a simplified block diagram 700 is shown illustrating an example deployment of an IoT application using a deployment manager (e.g., 215) implemented on a user device, IoT gateway, controller device, or other system. The deployment manager 215, in one example, may include an IoT server 705 to serve one or more IoT applications using various combinations of devices (e.g., 105*a*, 105*b*, 130) discoverable within a particular location or network. The deployment manager 215 may additionally include a local configuration/service manager 710, which may manage access to local and remote configuration data and service logic, as well as the provisioning of devices (e.g., 105*a*, 105*b*, 130) in an IoT deployment with the same. Local configuration data and service logic may be stored in local storage 415 of the gateway 150. Additional configuration data and service logic may also be accessed and utilized by the deployment manager 215 by accessing (e.g., through configuration/service manager 710) one or more remote configuration and/or service managers (e.g., collectively 720) serving configuration data and/or service logic (e.g., at data store(s) 725).

Selection of the particular configuration data or service logic (e.g., from remote or local configuration storage) to be used in the deployment may be controlled by a user through user device or other controller, among other examples. Whether the configuration data or service logic originates from remote storage (e.g., 725), from a user device (e.g., 130), a device (e.g., 105*a*) to be potentially included in the deployed IoT application, storage 715 local to the deployment manager 215, or another source, the configuration data or service logic is to be first provided to the configuration/service manager 710 on the deployment manager 215 before being used for runtime deployment.

The deployment manager 215 itself may be configured to deploy various instances of the same IoT applications or of different IoT applications. Settings of each of these deployment instances may be pre-programmed or may be provided by an administrator (e.g., through an application on a user device (e.g., 130) in communication with the deployment manager 215), and these settings may drive what service logic and configuration data the gateway utilizes in runtime deployment of an IoT application. For instance, service manager (e.g., 710) of the deployment manager 215 may determine that particular service logic is to be employed for a particular IoT application deployment. The service logic may be accessed from local storage 715 and may, in some cases, indicate coordination with one or more other systems (e.g., 720) running additional service logic remote from the deployment manager 215, which the local service manager 710 is to request and utilize in certain circumstances and transactions. Upon identifying the service logic to use, the service manager 710 can provide the service logic 730 to the runtime manager 240 to initiate deployment of a corresponding IoT application.

Service logic (and the services provided through its execution) may define interactions between devices and the actions that are to be performed through the IoT application's deployment. The service logic may identify the assets required or desired within the deployment and may identify the same by asset abstraction (e.g., by capability abstraction). For instance, as implied in the example of FIG. 7, one or more UI capabilities may be defined for IoT service deployments, and one or more user devices (e.g., 130) may be discovered and selected to satisfy these abstracted requirements of the IoT service. Further, interactions or relationships between the devices may also be defined, with these definitions, too, being made by reference to respective asset abstractions. Accordingly, the service logic can define the set of devices (or device types) that is to be discovered by the gateway and drive the discovery and binding processes used to identify and select a set of devices (e.g., 105*a*, 105*b*, 130) to be used in the deployment.

The service logic may be carried out locally by the runtime manager 250. In some cases, the service can be implemented as a script and be utilized to trigger events and actions utilizing the deployed devices. As noted above, the service logic may also identify conditions where outside computing resources, such as a system hosting remote service logic is to be called upon, for instance, to assist in processing data returned by sensors in IoT application deployment. Services (performed locally or remotely through corresponding service logic) may include the receiving of inputs, such as sensor readings, static values or actuator triggers, functions, processes, and calculations to be applied to the inputs, UI inputs, and outputs generated based on the function results, which may in turn specify certain actions to be performed by an actuator or results to be presented on a user device (e.g., 130), among other examples. In some cases, portions of service logic may be distributed to computing resources, or assets, within the deployed IoT application, and a portion of the input processing and result generation for a deployment may be performed by computation assets on the deployed devices (e.g., 105a, 105b, 130) themselves. Such results may in turn be routed through or returned to the gateway for further processing (e.g., by service logic local to the deployment manager 215 or by service logic executed on a cloud-based backend system (e.g., 720), etc.).

Service deployment may begin with running the provided service logic on the runtime manager 250. The runtime manager 250 can process the logic to identify a set of asset abstractions mapped to requirements of the IoT application. Identification of these abstractions may prompt initiation of an asset discovery stage 740 (e.g., performed through the IoT Server 705). During discovery, devices (e.g., 105a, 105b, 130, etc.) may be discovered together with identifier information of each device to allow the deployment manager 215 to determine which asset abstraction(s) may be mapped to each device (with its respective collection of assets). In one example, the runtime manager 250 may first determine a set of resource abstractions mapped to the set of capability abstractions defined for a particular application and then determine which of the discovered assets satisfy which of the determined resource abstractions for the particular application). In the event that more assets of a particular type are identified within the location than are needed, the gateway can additional perform a binding analysis (according to one or more binding criteria) to select which device(s) to bind to one or more corresponding asset abstractions.

With the set of devices selected for a corresponding IoT application deployment, automated configuration of the devices may be performed by the deployment manager 215. Configuration data may embody a configuration that identifies one or more static settings relevant to a particular device to which the configuration is being applied. Multiple configurations may be provided for use in provisioning multiple different types of devices in a given deployment. Various configuration data in data stores may describe multiple, different preset configurations, each tailored to a specific scenario or deployment. Configuration data may be provided in a standard format, such as XML, JSON or CBOR file, among other examples. The local configuration manager (e.g., 710) may handle the deployment of configurations on the discovered devices (e.g., 105a, 105b, 130). The communication between the deployment manager 215 and the devices (e.g., 105a, 105b, 130) may be handled by the IoT server component 705. Configuration data is sent from the local configuration manager to corresponding devices discovered and selected for deployment in a particular IoT application, Depending on the number of devices, hardware capabilities of the local gateway 150 and the local network bandwidth and latency each device (e.g., 105a, 105b, 130) in a deployment, the deployment manager 215 may either send configuration data directly to each of the IoT devices in the deployment or may utilize one or more of the devices to distribute configuration data to other devices in a peer-to-peer fashion, among other examples.

The runtime manager 250 may define messages (e.g., 735) to be passed to the various devices in range of the deployment manager 215 to facilitate discovery of the devices (as well as ongoing discovery of new devices following deployment) and delivery of configuration data to the appropriate devices (e.g., 105a, 105b, 130). In some cases, the configuration manager 710 of the deployment manager 215 can identify the appropriate configurations corresponding to the discovered devices (e.g., 105a, 105b, 130) and provide corresponding configuration data (at 745) to the IoT server 705 for distribution (directly or through P2P sharing) of the configuration data to the appropriate devices.

For devices (e.g., 105a) including sensor assets (e.g., 110a), configuration data may indicate to the asset (and its host device) how it is to collect and relay data using the sensors. For instance, configuration data may be utilized by the host device to cause data to be collected, generated, or reported at a particular interval, to tune the sensor to certain settings, to apply a filter to the information sensed by the sensor, among other examples. For devices (e.g., 105b) including actuator assets (e.g., 115a), configuration data may indicate to the asset how to respond to inputs (e.g., provided through the gateway) and perform activities in response to these requests. For instance, the configuration data for an actuator asset may cause an actuator to wait for certain commands or messages 750, 755 (e.g., from the IoT server 705) before an action, to tune its actions to particular settings, select which actions are performed or how they are performed through the actuator, among other examples. Configuration data may also be sent to assets tasked with satisfying UI capabilities of the application, with configuration data potentially driving the style or type of UI elements provided to a user through a device (e.g., 130) in connection with the deployment.

With the configuration data 745 provided to the discovered devices (e.g., 105a, 105b, 130) initial deployment may be considered complete and devices (e.g., 105a, 105b, 130) and their respective assets (e.g., 110a, 115a, 266, 268, 278, etc.) may operate in accordance with the configurations provided them. Accordingly, during runtime, sensing messages (e.g., 750) may be sent up to the deployment manager 215 from the devices (e.g., 105a, 105b). Data from UI inputs and data to be rendered in UI outputs (e.g., 755) may also be transmitted. In one example, runtime manager 250 can receive the sensing messages (at 735) and utilize service logic either local to or remote from the deployment manager 215 to process the sensor data as inputs. In some implementations, the runtime manager 250 may redirect or forward sensor data to one or more deployed computing (e.g., 266) or storage (e.g., 268) assets for processing on another one of the deployed devices (e.g., 130), among other examples. One or more results may be generated from the processing and used as the basis of actuating messages sent from the runtime manager 250 to the IoT server (at 735) for delivery (at 750) to one or more specific actuator assets (e.g., 115a on devices 105b) to cause a corresponding activity to be performed. Results of the processing may also be provided to assets providing UI output functionality (e.g., at 755). In this manner, a system of IoT service deployment and resource management may be provided which enables auto-configuration of devices and fast deployment of services making use of those configurations, including services with UI features allowing runtime control of the deployment by one or more users, among other examples.

While some of the systems and solution described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Figure 8:
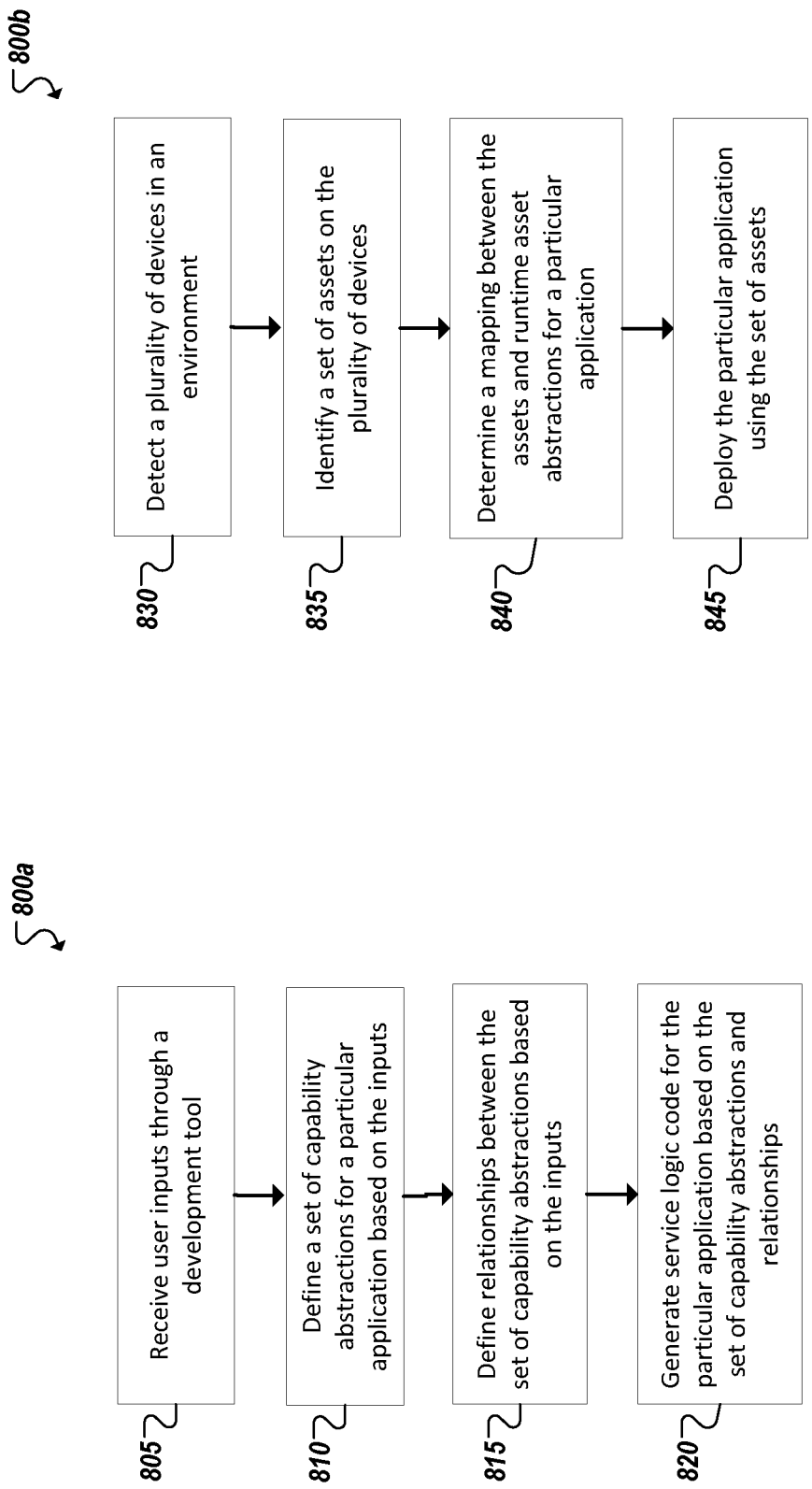
FIG. 8A is a flowchart illustrating an example technique for developing an application using asset abstraction.
FIG. 8B is a flowchart illustrating an example technique for deploying an example machine-to-machine network utilizing asset abstraction.

FIGS. 8A-8B are simplified flowcharts 800a-b illustrating example techniques for developing and deploying an IoT application or other machine-to-machine system. For instance, in the example of FIG. 8A, a development tool may be provided through which user inputs may be received 805. The user inputs may cause a set of capability abstractions to be selected (e.g., from a library of capability abstractions) to define 810 functionality to be included in a new IoT application. The development tool may be further used to define 815 relationships between the selected set of capability abstractions. Service logic may be automatically generated 820 from the defined set of capability abstractions that is executable to perform deployment of the IoT application in any one of a plurality of different environments and potentially using varying collections of specific devices and assets.

For instance, in the example of FIG. 8B, a gateway or other IoT management system may be utilized to discover 830 a plurality of devices within an environment. The IoT management system may determine 835 assets present on the discovered devices and select devices for a particular deployment of an IoT application based on the assets meeting one or more asset abstraction requirements (e.g., capability abstractions) defined for the a particular IoT application (e.g., the application developed in the example of FIG. 8A). In some cases, the gateway may make these determinations (e.g., 835) autonomously, while in other cases the gateway may consume services of a remote system in connection with making the determination 835. Selection of the devices may include determining 840 a mapping between runtime abstractions (which map to capability abstractions of the IoT application) and the selected assets. At least some of these runtime abstractions can correspond to UI capability abstractions, and corresponding assets may be identified by the IoT management system to implement UIs in an IoT application deployment that enable runtime manipulation of the deployment by one or more users. The IoT management system may interact with, access logic for, and/or identify the participating devices, not by their specific identities, but rather by their runtime abstractions. Runtime abstractions may represent the interface between the IoT management system (and application logic) and the devices within a particular deployment. Further, in some cases, multiple deployments of the same application (even within the same location or environment) may be supported by an IoT management system and distinct deployments may each have their own set of runtime abstractions. Further, configuration data may be identified for the deployment that is likewise mapped to runtime abstractions. The IoT management system may deliver corresponding portions of the configuration data to the selected assets mapped to these runtime abstractions to deploy 845 the particular application in the environment using the selected assets. Following deployment, sensor data may be generated by deployed sensor assets and this sensor data may be used by computation logic and/or actuator assets deployed in the IoT application and UI outputs may provide views into actuator status, sensor data values, and the results of computation logic, among other examples.

Figure 9:
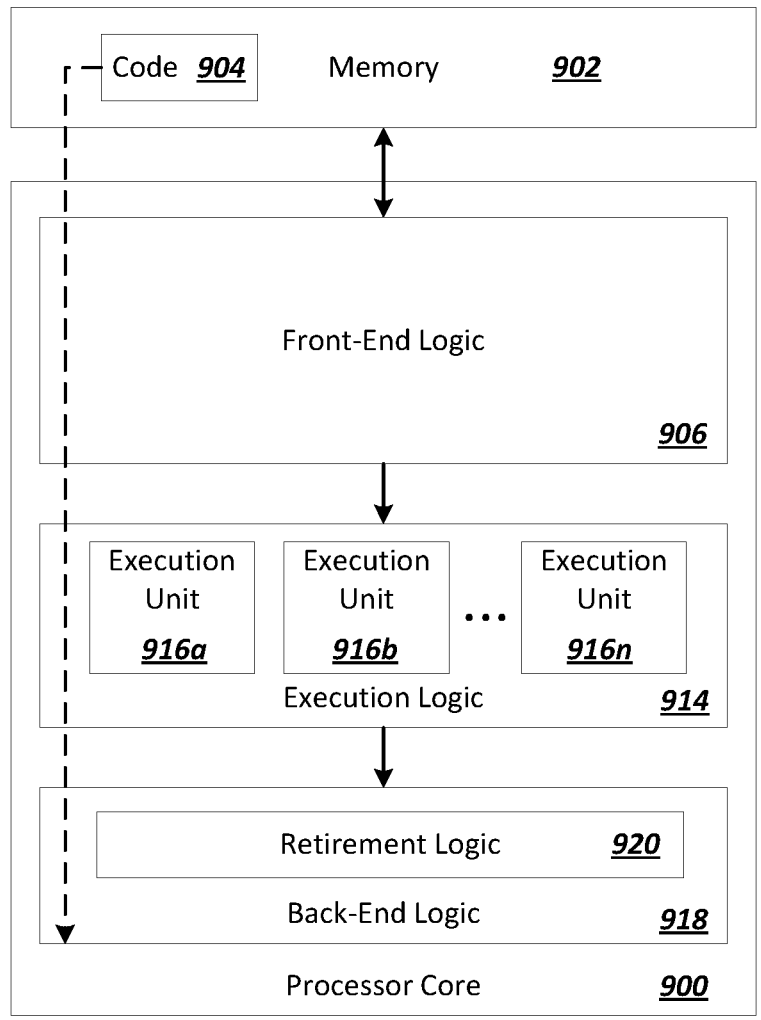
FIG. 9 is a block diagram of an exemplary processor in accordance with one embodiment.
Figure 10:
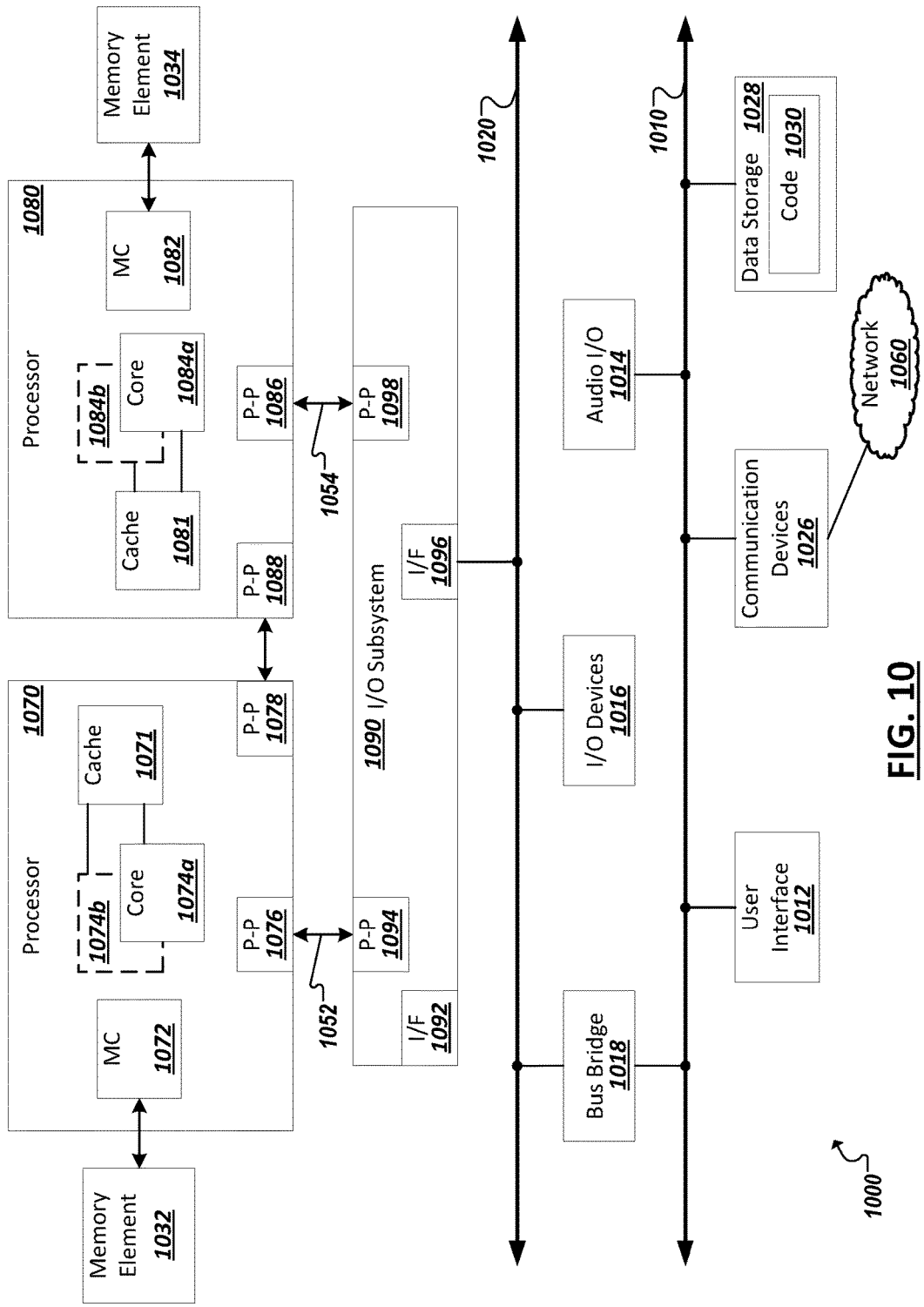
FIG. 10 is a block diagram of an exemplary computing system in accordance with one embodiment.

FIGS. 9-10 are block diagrams of exemplary computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 9-10.

FIG. 9 is an example illustration of a processor according to an embodiment. Processor 900 is an example of a type of hardware device that can be used in connection with the implementations above. Processor 900 may be any type of processor, such as a microprocessor, an embedded processor, a digital signal processor (DSP), a network processor, a multi-core processor, a single core processor, or other device to execute code. Although only one processor 900 is illustrated in FIG. 9, a processing element may alternatively include more than one of processor 900 illustrated in FIG. 9. Processor 900 may be a single-threaded core or, for at least one embodiment, the processor 900 may be multi-threaded in that it may include more than one hardware thread context (or "logical processor") per core.

FIG. 9 also illustrates a memory 902 coupled to processor 900 in accordance with an embodiment. Memory 902 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 900 can execute any type of instructions associated with algorithms, processes, or operations detailed herein. Generally, processor 900 can transform an element or an article (e.g., data) from one state or thing to another state or thing.

Code 904, which may be one or more instructions to be executed by processor 900, may be stored in memory 902, or may be stored in software, hardware, firmware, or any suitable combination thereof, or in any other internal or external component, device, element, or object where appropriate and based on particular needs. In one example, processor 900 can follow a program sequence of instructions indicated by code 904. Each instruction enters a front-end logic 906 and is processed by one or more decoders 908. The decoder may generate, as its output, a micro operation such as a fixed width micro operation in a predefined format, or may generate other instructions, microinstructions, or control signals that reflect the original code instruction. Front-end logic 906 also includes register renaming logic 910 and scheduling logic 912, which generally allocate resources and queue the operation corresponding to the instruction for execution.

Processor 900 can also include execution logic 914 having a set of execution units 916a, 916b, 916n, etc. Some embodiments may include a number of execution units dedicated to specific functions or sets of functions. Other embodiments may include only one execution unit or one execution unit that can perform a particular function. Execution logic 914 performs the operations specified by code instructions.

After completion of execution of the operations specified by the code instructions, back-end logic 918 can retire the instructions of code 904. In one embodiment, processor 900 allows out of order execution but requires in order retirement of instructions. Retirement logic 920 may take a variety of known forms (e.g., re-order buffers or the like). In this manner, processor 900 is transformed during execution of code 904, at least in terms of the output generated by the decoder, hardware registers and tables utilized by register renaming logic 910, and any registers (not shown) modified by execution logic 914.

Although not shown in FIG. 9, a processing element may include other elements on a chip with processor 900. For example, a processing element may include memory control logic along with processor 900. The processing element may include I/O control logic and/or may include I/O control logic integrated with memory control logic. The processing element may also include one or more caches. In some embodiments, non-volatile memory (such as flash memory or fuses) may also be included on the chip with processor 900.

FIG. 10 illustrates a computing system 1000 that is arranged in a point-to-point (PtP) configuration according to an embodiment. In particular, FIG. 10 shows a system where processors, memory, and input/output devices are interconnected by a number of point-to-point interfaces. Generally, one or more of the computing systems described herein may be configured in the same or similar manner as computing system 1000.

Processors 1070 and 1080 may also each include integrated memory controller logic (MC) 1072 and 1082 to communicate with memory elements 1032 and 1034. In alternative embodiments, memory controller logic 1072 and 1082 may be discrete logic separate from processors 1070 and 1080. Memory elements 1032 and/or 1034 may store various data to be used by processors 1070 and 1080 in achieving operations and functionality outlined herein.

Processors 1070 and 1080 may be any type of processor, such as those discussed in connection with other figures. Processors 1070 and 1080 may exchange data via a point-to-point (PtP) interface 1050 using point-to-point interface circuits 1078 and 1088, respectively. Processors 1070 and 1080 may each exchange data with a chipset 1090 via individual point-to-point interfaces 1052 and 1054 using point-to-point interface circuits 1076, 1086, 1094, and 1098. Chipset 1090 may also exchange data with a high-performance graphics circuit 1038 via a high-performance graphics interface 1039, using an interface circuit 1092, which could be a PtP interface circuit. In alternative embodiments, any or all of the PtP links illustrated in FIG. 10 could be implemented as a multi-drop bus rather than a PtP link.

Chipset 1090 may be in communication with a bus 1020 via an interface circuit 1096. Bus 1020 may have one or more devices that communicate over it, such as a bus bridge 1018 and I/O devices 1016. Via a bus 1010, bus bridge 1018 may be in communication with other devices such as a user interface 1012 (such as a keyboard, mouse, touchscreen, or other input devices), communication devices 1026 (such as modems, network interface devices, or other types of communication devices that may communicate through a computer network 1060), audio I/O devices 1014, and/or a data storage device 1028. Data storage device 1028 may store code 1030, which may be executed by processors 1070 and/or 1080. In alternative embodiments, any portions of the bus architectures could be implemented with one or more PtP links.

The computer system depicted in FIG. 10 is a schematic illustration of an embodiment of a computing system that may be utilized to implement various embodiments discussed herein. It will be appreciated that various components of the system depicted in FIG. 10 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

In general, one aspect of the subject matter described in this specification can be embodied in methods and executed instructions that include or cause the actions of identifying a sample that includes software code, generating a control flow graph for each of a plurality of functions included in the sample, and identifying, in each of the functions, features corresponding to instances of a set of control flow fragment types. The identified features can be used to generate a feature set for the sample from the identified features These and other embodiments can each optionally include one or more of the following features. The features identified for each of the functions can be combined to generate a consolidated string for the sample and the feature set can be generated from the consolidated string. A string can be generated for each of the functions, each string describing the respective features identified for the function. Combining the features can include identifying a call in a particular one of the plurality of functions to another one of the plurality of functions and replacing a portion of the string of the particular function referencing the other function with contents of the string of the other function. Identifying the features can include abstracting each of the strings of the functions such that only features of the set of control flow fragment types are described in the strings. The set of control flow fragment types can include memory accesses by the function and function calls by the function. Identifying the features can include identifying instances of memory accesses by each of the functions and identifying instances of function calls by each of the functions. The feature set can identify each of the features identified for each of the functions. The feature set can be an n-graph.

Further, these and other embodiments can each optionally include one or more of the following features. The feature set can be provided for use in classifying the sample. For instance, classifying the sample can include clustering the sample with other samples based on corresponding features of the samples. Classifying the sample can further include determining a set of features relevant to a cluster of samples. Classifying the sample can also include determining whether to classify the sample as malware and/or determining whether the sample is likely one of one or more families of malware. Identifying the features can include abstracting each of the control flow graphs such that only features of the set of control flow fragment types are described in the control flow graphs. A plurality of samples can be received, including the sample. In some cases, the plurality of samples can be received from a plurality of sources. The feature set can identify a subset of features identified in the control flow graphs of the functions of the sample. The subset of features can correspond to memory accesses and function calls in the sample code.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. One or more embodiments may provide a system, a machine readable storage medium, an apparatus, and/or method to define, based on one or more user inputs received through a graphical user interface of a programming tool, a set of capability abstractions for a particular application and further define, based on the one or more user inputs, relationships between the set of capability abstractions. The particular application is to utilize a machine-to-machine network, and the set of capability abstractions can include: at least one sensor capability abstraction, at least one actuator capability abstraction, at least one computation logic capability abstraction, at least one input user interface (UI) capability abstraction, and at least one output UI capability abstraction for the particular application. The relationships can include a relationship between the input UI capability abstraction and the computation logic capability abstraction, where the input UI capability is to provide an input to the computation logic capability abstraction. Executable code including service logic may be generated to deploy an instance of the particular application in an environment, where the code is generated based on the set of capability abstractions and the relationships.

In one example, deploying the instance of the particular application includes selecting one or more devices in the environment for inclusion in the deployed instance of the particular application to implement a user interface for the particular application, and the user interface is provided based on at least one of the input UI capability abstraction and the output UI capability abstraction.

In one example, the input UI capability abstraction includes a first input UI capability abstraction and the set of capability abstractions further includes a second input UI capability abstraction.

In one example, the first input UI capability abstraction corresponds to providing a first type of input UI element in the user interface and the second input UI capability abstraction corresponds to providing a different, second type of input UI element in the user interface.

In one example, the user interface enables runtime modifications to the deployed instance of the particular application.

In one example, the service logic is executable to identify a set of resource abstractions corresponding to the set of capability abstractions, and identify a collection of assets in the environment satisfying the set of resource abstractions.

In one example, the service logic is further to select at least a portion of the collection of assets for deployment in the instance of the particular application.

In one example, selection of the portion of the collection of assets is based on respective proximity of the assets to a management system corresponding to the environment.

In one example, the management system includes a gateway to communicate wirelessly with the collection of assets.

In one example, the service logic is executed at least in part at the gateway.

In one example, at least a particular one of the set of capability abstractions maps to a plurality of resource abstractions in the set of resource abstractions and another one of the set of capability abstractions maps to a single one of the set of resource abstractions.

In one example, the input UI capability abstraction and output UI capability abstraction each map to a respective plurality of resource abstractions in the set of resource abstractions.

In one example, the service logic identifies the collection of assets following deployment of the instance of the particular application according to respective runtime abstractions mapped to the set of capability abstractions.

In one example, the set of capability abstractions are selected from a library of capability abstractions and the library of capability abstractions includes a plurality of different input UI capability abstractions, and a plurality of different output UI capability abstractions.

In one example, the relationships include a relationship between the output UI capability abstraction and one of the sensor capability abstraction, actuator capability abstraction, and computation logic capability abstraction.

In one example, the computation logic capability abstraction corresponds to performance of an operation on sensor data to be generated by assets corresponding to the sensor capability abstraction.

In one example, the service logic is reusable to deploy the particular application in another environment using a different collection of assets.

In one example, the one or more user inputs are received through a graphical user interface of an application programming tool.

One or more embodiments may provide a system, a machine readable storage medium, an apparatus, and/or method to detect a plurality of devices within an environment including a user computing device, identify a set of assets hosted on each of the plurality of devices, determine a mapping between each of the assets in the subset of assets and a respective one of a set of runtime asset abstractions defined for a particular application, and deploy the particular application using the plurality of devices. The set of runtime asset abstractions may include at least one output user interface (UI) abstraction, at least one input UI abstraction, at least one sensor asset abstraction, at least one actuator asset abstraction, and at least one computation logic asset abstraction, and assets of the user computing device may be mapped to the output UI abstraction, the input UI abstraction, and the computing asset abstraction.

In one example, the set of runtime asset abstractions correspond to a set of capability abstractions defined in code of the particular application.

In one example, the code further defines relationships between the set of capability abstractions.

In one example, the particular application is deployed using the plurality of devices in a first deployment and the particular application is deployed using a different plurality of devices according to the set of capability abstractions in a subsequent second deployment.

In one example, the instructions are further executable to identify particular configuration data corresponding to deployment of the particular application, and deploying the particular application includes sending the particular configuration data to the plurality of devices to configure assets of the plurality of devices for runtime of the particular application.

In one example, each of the input UI capability abstraction and output UI capability abstraction map to a respective plurality of asset types.

In one example, a system may include a system manager and the system manager may be hosted at least in part on a gateway configured to communicate with the plurality of assets.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

The invention claimed is:

1. At least one machine accessible storage medium having instructions stored thereon, the instructions when executed on a machine, cause the machine to:
define, based on one or more user inputs received through a graphical user interface of a programming tool, a set of capability abstractions for a particular application, wherein the particular application is to utilize a machine-to-machine network, and the set of capability abstractions comprises: at least one sensor capability abstraction, at least one actuator capability abstraction, at least one computation logic capability abstraction, at least one input user interface (UI) capability abstraction, and at least one output UI capability abstraction for the particular application;
define, based on the one or more user inputs, relationships between the set of capability abstractions, wherein the relationships comprise a particular relationship between the input UI capability abstraction and the computation logic capability abstraction, wherein the particular relationship defines that the input UI capability abstraction is to provide an input to the computation logic capability abstraction; and
generate executable code comprising service logic to deploy an instance of the particular application in an environment, wherein the code is generated based on the set of capability abstractions and the relationships.

2. The storage medium of claim 1, wherein deploying the instance of the particular application comprises selecting one or more devices in the environment for inclusion in the deployed instance of the particular application to implement a user interface for the particular application, and the user interface is provided based on at least one of the input UI capability abstraction and the output UI capability abstraction.

3. The storage medium of claim 2, wherein the input UI capability abstraction comprises a first input UI capability abstraction and the set of capability abstractions further comprises a second input UI capability abstraction.

4. The storage medium of claim 3, wherein the first input UI capability abstraction corresponds to providing a first type of input UI element in the user interface and the second input UI capability abstraction corresponds to providing a different, second type of input UI element in the user interface.

5. The storage medium of claim 2, wherein the user interface enables runtime modifications to the deployed instance of the particular application.

6. The storage medium of claim 1, wherein the service logic is executable to:
identify a set of resource abstractions corresponding to the set of capability abstractions; and
identify a collection of assets in the environment satisfying the set of resource abstractions.

7. The storage medium of claim 6, wherein the service logic is further to select at least a portion of the collection of assets for deployment in the instance of the particular application.

8. The storage medium of claim 7, wherein selection of the portion of the collection of assets is based on respective proximity of the assets to a management system corresponding to the environment.

9. The storage medium of claim 8, wherein the management system comprises a gateway to communicate wirelessly with the collection of assets.

10. The storage medium of claim 9, wherein the service logic is executed at least in part at the gateway.

11. The storage medium of claim 6, wherein at least a particular one of the set of capability abstractions maps to a plurality of resource abstractions in the set of resource abstractions and another one of the set of capability abstractions maps to a single one of the set of resource abstractions.

12. The storage medium of claim 11, wherein the input UI capability abstraction and output UI capability abstraction each map to a respective plurality of resource abstractions in the set of resource abstractions.

13. The storage medium of claim 6, wherein the service logic identifies the collection of assets following deployment of the instance of the particular application according to respective runtime abstractions mapped to the set of capability abstractions.

14. The storage medium of claim 1, wherein the set of capability abstractions are selected from a library of capability abstractions and the library of capability abstractions comprises a plurality of different input UI capability abstractions, and a plurality of different output UI capability abstractions.

15. The storage medium of claim 1, wherein the relationships comprise a relationship between the output UI capability abstraction and one of the sensor capability abstraction, actuator capability abstraction, and computation logic capability abstraction.

16. The storage medium of claim 1, wherein the computation logic capability abstraction corresponds to performance of an operation on sensor data to be generated by assets corresponding to the sensor capability abstraction.

17. The storage medium of claim 1, wherein the service logic is reusable to deploy the particular application in another environment using a different collection of assets.

18. A method comprising:
receiving one or more user inputs received through a graphical user interface of an application programming tool;
defining, based on the one or more user inputs, a set of capability abstractions for a particular application, wherein the particular application is to utilize a machine-to-machine network, and the set of capability abstractions comprises: at least one sensor capability abstraction, at least one actuator capability abstraction, a computation logic capability abstraction, at least one input user interface (UI) capability abstraction, and at least one output UI capability abstraction for the particular application;
define, based on the one or more user inputs, relationships between the set of capability abstractions, wherein the relationships comprise a particular relationship between the input UI capability abstraction and the computation logic capability abstraction, wherein the particular relationship defines that the input UI capability abstraction is to provide an input to the computation logic capability abstraction; and
generate executable code comprising service logic to deploy an instance of the particular application in an environment, wherein the code is generated based on the set of capability abstractions and the relationships.

19. A system comprising:
a processor;
a memory;
a development system executable by the processor to:
define, based on one or more user inputs received through a graphical user interface of a programming tool, a set of capability abstractions for a particular application, wherein the particular application is to utilize a machine-to-machine network, and the set of capability abstractions comprises: at least one sensor capability abstraction, at least one actuator capability abstraction, at least one computation logic capability abstraction, at least one input user interface (UI) capability abstraction, and at least one output UI capability abstraction for the particular application;
define, based on the one or more user inputs, relationships between the set of capability abstractions, wherein the relationships comprise a particular relationship between the input UI capability abstraction and the computation logic capability abstraction, wherein the particular relationship defines that the input UI capability abstraction is to provide an input to the computation logic capability abstraction; and
generate executable code comprising service logic to deploy an instance of the particular application in an environment, wherein the code is generated based on the set of capability abstractions and the relationships.

* * * * *